(12) United States Patent
Qiu et al.

(10) Patent No.: US 9,507,173 B2
(45) Date of Patent: Nov. 29, 2016

(54) SILICONE HYDROGEL LENS WITH A CROSSLINKED HYDROPHILIC COATING

(71) Applicant: Novartis AG, Basel (CH)

(72) Inventors: Yongxing Qiu, Suwanee, GA (US); Newton T. Samuel, Suwanee, GA (US); John Dallas Pruitt, Suwanee, GA (US); Chandana Kolluru, Suwanee, GA (US); Arturo Norberto Medina, Suwanee, GA (US); Lynn Cook Winterton, Keller, TX (US); Daqing Wu, Suwanee, GA (US); Xinming Qian, Johns Creek, GA (US); Jared Nelson, Buford, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 14/962,354

(22) Filed: Dec. 8, 2015

(65) Prior Publication Data

US 2016/0091734 A1   Mar. 31, 2016

Related U.S. Application Data

(63) Continuation of application No. 14/571,350, filed on Dec. 16, 2014, now Pat. No. 9,239,409, which is a continuation of application No. 13/948,206, filed on Jul. 23, 2013, now Pat. No. 8,944,592, which is a continuation of application No. 13/193,651, filed on Jul. 29, 2011, now Pat. No. 8,529,057.

(60) Provisional application No. 61/448,478, filed on Mar. 2, 2011, provisional application No. 61/369,102, filed on Jul. 30, 2010.

(51) Int. Cl.

| | |
|---|---|
| G02C 7/00 | (2006.01) |
| G02C 7/04 | (2006.01) |
| G02B 1/04 | (2006.01) |
| G02B 1/10 | (2015.01) |
| G02B 1/18 | (2015.01) |
| C08J 7/04 | (2006.01) |

(52) U.S. Cl.
CPC ............. *G02C 7/049* (2013.01); *C08J 7/042* (2013.01); *G02B 1/043* (2013.01); *G02B 1/10* (2013.01); *G02B 1/18* (2015.01); *C08J 2383/04* (2013.01); *C08J 2433/02* (2013.01); *C08J 2487/00* (2013.01); *G02C 2202/06* (2013.01); *G02C 2202/16* (2013.01)

(58) Field of Classification Search
CPC ........... G02C 7/00; G02C 7/02; G02C 7/04; A61L 31/10; A61L 31/16; B44F 7/00; B44C 5/00; G02B 1/043
USPC ............ 351/159.01, 159.02, 159.33, 159.73; 428/13; 427/2.1; 521/905; 526/930
See application file for complete search history.

(56) References Cited

U.S. PATENT DOCUMENTS

| | | |
|---|---|---|
| 2,296,891 A | 9/1942 | Andersen |
| 2,926,154 A | 2/1960 | Keim |
| 3,224,986 A | 12/1965 | Butler |
| 3,408,429 A | 10/1968 | Wichterle |
| 3,434,984 A | 3/1969 | Hyland, Jr. |
| 3,488,327 A | 1/1970 | Kollinsky |
| 3,566,874 A | 3/1971 | Shepherd |
| 3,583,950 A | 6/1971 | Kollinsky |
| 3,598,790 A | 8/1971 | Kollinsky |
| 3,609,126 A | 9/1971 | Asao |
| 3,616,935 A | 11/1971 | Love |
| 3,617,344 A | 11/1971 | Leininger |
| 3,634,123 A | 1/1972 | Eriksson |
| 3,639,141 A | 2/1972 | Dyck |
| 3,663,288 A | 5/1972 | Miller |
| 3,695,921 A | 10/1972 | Shepherd |
| 3,700,623 A | 10/1972 | Keim |

(Continued)

FOREIGN PATENT DOCUMENTS

| | | |
|---|---|---|
| CA | 2378841 C | 1/2007 |
| EP | 0321403 A2 | 6/1989 |

(Continued)

OTHER PUBLICATIONS

English Translation of Chinese Office Action, Chinese Patent Application for Invention No: 201180037428.8, Office Action Issue date: Dec. 19, 2013.
Canadian Examiner's Report dated Apr. 3, 2014, Canadian Application No. 2,802,337.
English Translation of Taiwan Search Report, Application No. 100127120, dated Feb. 10, 2015.
English Translation of Japan Office Action, Patent Application No. 2013-521994, Dispatch No. 183411, Dispatch Date: Apr. 21, 2015.
Authors: Sang-Kyu Kam, John Gregory, Title: Charge determination of synthetic cationic polyelectrolytes by colloid titration, Published: Colloids and Surfaces A Physicochemical and Engineering Aspects 159 (1999) 165-179.
Authors: Niklaus Buhler, Hans-Peter Haerri, Manfred Hofmann, Christine Irrgang, Andreas Mühlebach, Beat Müller, and Friedrich Stockinger, Title: Nelfilcon A, a New Material for Contact Lenses, Published: Chimia 53 (1999) 269-274 Industrial Chemistry.

(Continued)

*Primary Examiner* — James Greece
(74) *Attorney, Agent, or Firm* — Jian Zhou

(57) ABSTRACT

The invention is related to a cost-effective method for making a silicone hydrogel contact lens having a crosslinked hydrophilic coating thereon. A method of the invention involves heating a silicone hydrogel contact lens in an aqueous solution in the presence of a water-soluble, highly branched, thermally-crosslinkable hydrophilic polymeric material having positively-charged azetidinium groups, to and at a temperature from about 40° C. to about 140° C. for a period of time sufficient to covalently attach the thermally-crosslinkable hydrophilic polymeric material onto the surface of the silicone hydrogel contact lens through covalent linkages each formed between one azetidinium group and one of the reactive functional groups on and/or near the surface of the silicone hydrogel contact lens, thereby forming a crosslinked hydrophilic coating on the silicone hydrogel contact lens. Such method can be advantageously implemented directly in a sealed lens package during autoclave.

20 Claims, No Drawings

(56) References Cited

U.S. PATENT DOCUMENTS

| | | |
|---|---|---|
| 3,717,502 A | 2/1973 | Masuhara |
| 3,772,076 A | 11/1973 | Keim |
| 3,813,695 A | 6/1974 | Podell, Jr. |
| 3,844,989 A | 10/1974 | Harumiya |
| 3,861,396 A | 1/1975 | Vaillancourt |
| 3,895,166 A | 7/1975 | Wood |
| 3,900,672 A | 8/1975 | Hammond |
| 3,925,178 A | 12/1975 | Gesser |
| 3,975,350 A | 8/1976 | Hudgin |
| 4,060,657 A | 11/1977 | Iwami |
| 4,118,485 A | 10/1978 | Eriksson |
| 4,132,695 A | 1/1979 | Burkholder |
| 4,136,250 A | 1/1979 | Mueller |
| 4,143,949 A | 3/1979 | Chen |
| 4,153,641 A | 5/1979 | Deichert |
| 4,154,898 A | 5/1979 | Burkholder, Jr. |
| 4,168,112 A | 9/1979 | Ellis |
| 4,182,822 A | 1/1980 | Chang |
| 4,189,546 A | 2/1980 | Deichert |
| 4,191,596 A | 3/1980 | Dollman |
| 4,217,038 A | 8/1980 | Letter |
| 4,229,838 A | 10/1980 | Mano |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,263,188 A | 4/1981 | Hampton |
| 4,276,402 A | 6/1981 | Chromecek |
| 4,280,970 A | 7/1981 | Kesting |
| 4,293,642 A | 10/1981 | Beavan |
| 4,298,639 A | 11/1981 | Van Eenam |
| 4,298,715 A | 11/1981 | Van Eenam |
| 4,312,575 A | 1/1982 | Peyman |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,373,009 A | 2/1983 | Winn |
| 4,379,893 A | 4/1983 | O'Malley |
| 4,427,823 A | 1/1984 | Inagaki |
| 4,444,711 A | 4/1984 | Schad |
| 4,450,045 A | 5/1984 | Hertel |
| 4,460,534 A | 7/1984 | Boehm |
| 4,462,665 A | 7/1984 | Shah |
| 4,486,577 A | 12/1984 | Mueller |
| 4,487,808 A | 12/1984 | Lambert |
| 4,495,313 A | 1/1985 | Larsen |
| 4,499,154 A | 2/1985 | James |
| 4,521,564 A | 6/1985 | Solomon |
| 4,527,293 A | 7/1985 | Eckstein |
| 4,543,398 A | 9/1985 | Bany |
| 4,546,123 A | 10/1985 | Schäfer |
| 4,548,844 A | 10/1985 | Podell |
| 4,565,740 A | 1/1986 | Gölander |
| 4,575,476 A | 3/1986 | Podell |
| 4,605,712 A | 8/1986 | Mueller |
| 4,613,665 A | 9/1986 | Larm |
| 4,631,072 A | 12/1986 | Koller |
| 4,661,575 A | 4/1987 | Tom |
| 4,684,538 A | 8/1987 | Klemarczyk |
| 4,695,608 A | 9/1987 | Engler |
| 4,703,097 A | 10/1987 | Wingler |
| 4,720,512 A | 1/1988 | Hu |
| 4,734,475 A | 3/1988 | Goldenberg |
| 4,786,556 A | 11/1988 | Hu |
| 4,791,175 A | 12/1988 | Janssen |
| 4,833,218 A | 5/1989 | Lee |
| 4,837,289 A | 6/1989 | Mueller |
| 4,876,126 A | 10/1989 | Takemura |
| 4,892,402 A | 1/1990 | Sawamoto |
| 4,895,896 A | 1/1990 | Müller-Lierheim |
| 4,920,184 A | 4/1990 | Schäfer |
| 4,943,460 A | 7/1990 | Markle |
| 4,954,586 A | 9/1990 | Toyoshima |
| 4,954,587 A | 9/1990 | Mueller |
| 4,959,074 A | 9/1990 | Halpern |
| 4,968,532 A | 11/1990 | Janssen |
| 4,973,359 A | 11/1990 | Yamasoe |
| 4,973,493 A | 11/1990 | Guire |
| 4,978,481 A | 12/1990 | Janssen |
| 4,979,959 A | 12/1990 | Guire |
| 4,990,357 A | 2/1991 | Karakelle |
| 5,002,582 A | 3/1991 | Guire |
| 5,010,141 A | 4/1991 | Mueller |
| 5,019,393 A | 5/1991 | Ito |
| 5,034,461 A | 7/1991 | Lai |
| 5,039,459 A | 8/1991 | Kindt-Larsen |
| 5,039,761 A | 8/1991 | Ono |
| 5,049,403 A | 9/1991 | Larm |
| 5,053,048 A | 10/1991 | Pinchuk |
| 5,061,738 A | 10/1991 | Solomon |
| 5,070,170 A | 12/1991 | Robertson |
| 5,079,093 A | 1/1992 | Akashi |
| 5,079,319 A | 1/1992 | Mueller |
| 5,080,924 A | 1/1992 | Kamel |
| 5,091,205 A | 2/1992 | Fan |
| 5,108,776 A | 4/1992 | Goldberg |
| 5,112,900 A | 5/1992 | Buddenhagen |
| 5,132,108 A | 7/1992 | Narayanan |
| 5,135,297 A | 8/1992 | Valint, Jr. |
| 5,135,516 A | 8/1992 | Sahatjian |
| 5,155,194 A | 10/1992 | Kossmehl |
| 5,160,790 A | 11/1992 | Elton |
| 5,165,919 A | 11/1992 | Sasaki |
| 5,208,111 A | 5/1993 | Decher |
| 5,210,111 A | 5/1993 | Goldenberg |
| 5,214,452 A | 5/1993 | Kossmehl |
| 5,217,492 A | 6/1993 | Guire |
| 5,229,211 A | 7/1993 | Murayama |
| 5,262,484 A | 11/1993 | Coleman |
| 5,263,992 A | 11/1993 | Guire |
| 5,270,046 A | 12/1993 | Sakamoto |
| 5,272,012 A | 12/1993 | Opolski |
| 5,290,548 A | 3/1994 | Goldberg |
| 5,290,585 A | 3/1994 | Elton |
| 5,292,514 A | 3/1994 | Capecchi |
| 5,308,641 A | 5/1994 | Cuhalan |
| 5,312,873 A | 5/1994 | Gregor |
| 5,346,946 A | 9/1994 | Yokoyama |
| 5,348,873 A | 9/1994 | Matsuda |
| 5,350,800 A | 9/1994 | Verhoeven |
| 5,352,714 A | 10/1994 | Lai |
| 5,355,213 A | 10/1994 | Dotan |
| 5,358,995 A | 10/1994 | Lai |
| 5,387,632 A | 2/1995 | Lai |
| 5,397,848 A | 3/1995 | Yang |
| 5,407,715 A | 4/1995 | Buddenhagen |
| 5,408,002 A | 4/1995 | Coleman |
| 5,408,280 A | 4/1995 | von der Haegen |
| 5,409,731 A | 4/1995 | Nakagawa |
| 5,416,131 A | 5/1995 | Wolff |
| 5,416,132 A | 5/1995 | Yokoyama |
| 5,417,969 A | 5/1995 | Hsu |
| 5,441,488 A | 8/1995 | Shimura |
| 5,442,402 A | 8/1995 | Sohn |
| 5,443,907 A | 8/1995 | Slaikeu |
| 5,451,617 A | 9/1995 | Lai |
| 5,461,433 A | 10/1995 | Nakabayashi |
| 5,470,944 A | 11/1995 | Bonsignore |
| 5,475,450 A | 12/1995 | Meadows |
| 5,476,665 A | 12/1995 | Dennison |
| 5,486,579 A | 1/1996 | Lai |
| 5,495,064 A | 2/1996 | James |
| 5,500,732 A | 3/1996 | Ebel |
| 5,508,317 A | 4/1996 | Müller |
| 5,509,899 A | 4/1996 | Fan |
| 5,510,004 A | 4/1996 | Allen |
| 5,510,418 A | 4/1996 | Rhee |
| 5,527,925 A | 6/1996 | Chabrecek |
| 5,528,357 A | 6/1996 | Davis |
| 5,532,311 A | 7/1996 | Sirvio |
| 5,562,922 A | 10/1996 | Lambert |
| 5,563,056 A | 10/1996 | Swan |

(56) References Cited

U.S. PATENT DOCUMENTS

| | | |
|---|---|---|
| 5,574,554 A | 11/1996 | Su |
| 5,578,675 A | 11/1996 | Mormile |
| 5,583,163 A | 12/1996 | Müller |
| 5,583,463 A | 12/1996 | Merritt |
| 5,584,882 A | 12/1996 | Yabushita |
| 5,591,140 A | 1/1997 | Narayanan |
| 5,597,873 A | 1/1997 | Chambers |
| 5,599,576 A | 2/1997 | Opolski |
| 5,612,389 A | 3/1997 | Chabrecek |
| 5,612,391 A | 3/1997 | Chabrecek |
| 5,614,035 A | 3/1997 | Nadkarni |
| 5,620,738 A | 4/1997 | Fan |
| 5,621,018 A | 4/1997 | Chabrecek |
| 5,626,000 A | 5/1997 | Edwards |
| 5,633,504 A | 5/1997 | Collins |
| 5,648,422 A | 7/1997 | Collins |
| 5,665,840 A | 9/1997 | Pöhlmann |
| 5,670,558 A | 9/1997 | Onishi |
| 5,672,638 A | 9/1997 | Verhoeven |
| 5,674,942 A | 10/1997 | Hill |
| 5,681,510 A | 10/1997 | Valint, Jr. |
| 5,688,855 A | 11/1997 | Stoy |
| 5,693,034 A | 12/1997 | Buscemi |
| 5,700,559 A | 12/1997 | Sheu |
| 5,702,754 A | 12/1997 | Zhong |
| 5,705,583 A | 1/1998 | Bowers |
| 5,710,302 A | 1/1998 | Kunzler |
| 5,712,326 A | 1/1998 | Jones |
| 5,712,327 A | 1/1998 | Chang |
| 5,712,356 A | 1/1998 | Bothe |
| 5,717,781 A | 2/1998 | Ebel |
| 5,719,669 A | 2/1998 | Ross, III |
| 5,723,145 A | 3/1998 | Shikinami |
| 5,731,087 A | 3/1998 | Fan |
| 5,739,236 A | 4/1998 | Bowers |
| 5,748,300 A | 5/1998 | Wilder |
| 5,760,100 A | 6/1998 | Nicolson |
| 5,766,158 A | 6/1998 | Opolski |
| 5,776,999 A | 7/1998 | Nicolson |
| 5,779,943 A | 7/1998 | Enns |
| 5,783,650 A | 7/1998 | Bowers |
| 5,789,461 A | 8/1998 | Nicolson |
| 5,789,462 A | 8/1998 | Motani |
| 5,789,464 A | 8/1998 | Müller |
| 5,792,531 A | 8/1998 | Littleton |
| 5,800,412 A | 9/1998 | Zhang |
| 5,801,822 A | 9/1998 | Lafferty |
| 5,804,318 A | 9/1998 | Pinchuk |
| 5,805,264 A | 9/1998 | Janssen |
| 5,805,276 A | 9/1998 | Davis |
| 5,807,944 A | 9/1998 | Hirt |
| 5,811,151 A | 9/1998 | Hendriks |
| 5,818,573 A | 10/1998 | Lafferty |
| 5,828,446 A | 10/1998 | Davis |
| 5,843,346 A | 12/1998 | Morrill |
| 5,849,810 A | 12/1998 | Müller |
| 5,849,811 A | 12/1998 | Nicolson |
| 5,849,841 A | 12/1998 | Mühlebach |
| 5,855,825 A | 1/1999 | Ito |
| 5,858,653 A | 1/1999 | Duran |
| 5,859,107 A | 1/1999 | Jones |
| 5,866,113 A | 2/1999 | Hebdriks |
| 5,869,127 A | 2/1999 | Zhong |
| 5,871,823 A | 2/1999 | Anders |
| 5,874,500 A | 2/1999 | Rhee |
| 5,879,436 A | 3/1999 | Kramer |
| 5,879,697 A | 3/1999 | Ding |
| 5,882,687 A | 3/1999 | Park |
| 5,885,647 A | 3/1999 | Larm |
| 5,894,002 A | 4/1999 | Boneberger |
| 5,910,518 A | 6/1999 | Nakada |
| 5,922,161 A | 7/1999 | Wu |
| 5,922,249 A | 7/1999 | Ajello |
| 5,936,052 A | 8/1999 | Bothe |
| 5,936,703 A | 8/1999 | Miyazaki |
| 5,945,498 A | 8/1999 | Höpken |
| 5,962,548 A | 10/1999 | Vanderlaan |
| 5,965,631 A | 10/1999 | Nicolson |
| 5,981,615 A | 11/1999 | Mejis |
| 5,981,675 A | 11/1999 | Valint, Jr. |
| 5,995,213 A | 11/1999 | Davis |
| 5,997,517 A | 12/1999 | Whitbourne |
| 6,007,526 A | 12/1999 | Passalaqua |
| 6,018,001 A | 1/2000 | Hiratani |
| 6,039,913 A | 3/2000 | Hirt |
| 6,043,328 A | 3/2000 | Domschke |
| 6,048,620 A | 4/2000 | Zhong |
| 6,054,504 A | 4/2000 | Dalla Riva Toma |
| 6,063,484 A | 5/2000 | Exsted |
| 6,087,415 A | 7/2000 | Vanderlaan |
| 6,087,462 A | 7/2000 | Bowers |
| 6,090,901 A | 7/2000 | Bowers |
| 6,096,138 A | 8/2000 | Heiler |
| 6,096,726 A | 8/2000 | Opolski |
| 6,099,122 A | 8/2000 | Chabrecek |
| 6,099,852 A | 8/2000 | Jen |
| 6,106,889 A | 8/2000 | Beavers |
| 6,134,342 A | 10/2000 | Doke |
| 6,149,842 A | 11/2000 | Lally |
| 6,165,322 A | 12/2000 | Bower |
| 6,169,127 B1 | 1/2001 | Lohmann |
| 6,179,817 B1 | 1/2001 | Zhong |
| 6,193,369 B1 | 2/2001 | Valint, Jr. |
| 6,207,796 B1 | 3/2001 | Dairoku |
| 6,218,508 B1 | 4/2001 | Kragh |
| 6,221,061 B1 | 4/2001 | Engelson |
| 6,225,431 B1 | 5/2001 | Bowers |
| 6,238,799 B1 | 5/2001 | Opolski |
| 6,284,854 B1 | 9/2001 | Bowers |
| 6,301,005 B1 | 10/2001 | Epstein |
| 6,303,687 B1 | 10/2001 | Müller |
| 6,306,514 B1 | 10/2001 | Weikel |
| 6,314,199 B1 | 11/2001 | Höfer |
| 6,323,165 B1 | 11/2001 | Heiler |
| 6,340,465 B1 | 1/2002 | Hsu |
| 6,342,570 B1 | 1/2002 | Bothe |
| 6,346,170 B1 | 2/2002 | Bower |
| 6,348,507 B1 | 2/2002 | Heiler |
| 6,364,934 B1 | 4/2002 | Nandu |
| 6,367,929 B1 | 4/2002 | Maiden |
| 6,410,616 B1 | 6/2002 | Harada |
| 6,428,839 B1 | 8/2002 | Künzler |
| 6,436,481 B1 | 8/2002 | Chabrecek |
| 6,440,366 B1 | 8/2002 | Salpekar |
| 6,440,571 B1 | 8/2002 | Valint, Jr. |
| 6,447,920 B1 | 9/2002 | Chabrecek |
| 6,451,871 B1 | 9/2002 | Winterton |
| 6,465,056 B1 | 10/2002 | Chabrecek |
| 6,465,602 B2 | 10/2002 | Schroeder |
| 6,478,423 B1 | 11/2002 | Turner |
| 6,479,227 B1 | 11/2002 | Kubo |
| 6,482,221 B1 | 11/2002 | Hebert |
| 6,500,481 B1 | 12/2002 | Vanderlaan |
| 6,517,678 B1 | 2/2003 | Shannon |
| 6,521,352 B1 | 2/2003 | Chabrecek |
| 6,531,432 B2 | 3/2003 | Molock |
| 6,534,559 B1 | 3/2003 | Vanderlaan |
| 6,537,614 B1 | 3/2003 | Wei |
| 6,551,267 B1 | 4/2003 | Cohen |
| 6,582,754 B1 | 6/2003 | Pasic |
| 6,586,038 B1 | 7/2003 | Chabrecek |
| 6,586,520 B1 | 7/2003 | Canorro |
| 6,589,665 B2 | 7/2003 | Chabrecek |
| 6,596,294 B2 | 7/2003 | Lai |
| 6,599,559 B1 | 7/2003 | McGee |
| 6,602,930 B2 | 8/2003 | Imafuku |
| 6,614,516 B1 | 9/2003 | Epstein |
| 6,623,747 B1 | 9/2003 | Chatelier |
| 6,623,786 B2 | 9/2003 | Baron |
| 6,627,124 B1 | 9/2003 | Herbrechtsmeier |
| 6,630,243 B2 | 10/2003 | Valint, Jr. |
| 6,638,563 B2 | 10/2003 | McGee |
| 6,673,447 B2 | 1/2004 | Wei |
| 6,683,062 B2 | 1/2004 | Opolski |

(56) References Cited

U.S. PATENT DOCUMENTS

| | | |
|---|---|---|
| 6,686,054 B2 | 2/2004 | Nigam |
| 6,689,480 B2 | 2/2004 | Shimoyama |
| 6,699,435 B2 | 3/2004 | Salpekar |
| 6,719,929 B2 | 4/2004 | Winterton |
| 6,730,366 B2 | 5/2004 | Lohmann |
| 6,733,123 B2 | 5/2004 | Polzhofer |
| 6,734,321 B2 | 5/2004 | Chabrecek |
| 6,740,336 B2 | 5/2004 | Trubetskoy |
| 6,743,878 B2 | 6/2004 | Bowers |
| 6,762,264 B2 | 7/2004 | Künzler et al. |
| 6,793,973 B2 | 9/2004 | Winterton |
| 6,794,456 B2 | 9/2004 | Grobe, III |
| 6,800,225 B1 | 10/2004 | Hagmann |
| 6,811,805 B2 | 11/2004 | Gilliard |
| 6,822,016 B2 | 11/2004 | McCabe |
| 6,835,410 B2 | 12/2004 | Chabrecek |
| 6,838,491 B1 | 1/2005 | Vanderlaan |
| 6,858,310 B2 | 2/2005 | McGee |
| 6,866,936 B2 | 3/2005 | Opolski |
| 6,866,938 B2 | 3/2005 | Mori |
| 6,867,245 B2 | 3/2005 | Iwata |
| 6,878,399 B2 | 4/2005 | Chabrecek |
| 6,884,457 B2 | 4/2005 | Gilliard |
| 6,891,010 B2 | 5/2005 | Kunzler |
| 6,896,926 B2 | 5/2005 | Qiu |
| 6,902,812 B2 | 6/2005 | Valint, Jr. |
| 6,921,802 B2 | 7/2005 | Künzler |
| 6,923,538 B2 | 8/2005 | Dean |
| 6,923,978 B2 | 8/2005 | Chatelier |
| 6,926,965 B2 | 8/2005 | Qiu |
| 6,936,641 B2 | 8/2005 | Molock |
| 6,940,580 B2 | 9/2005 | Winterton |
| 6,951,894 B1 | 10/2005 | Nicolson |
| 7,018,688 B2 | 3/2006 | Shepherd |
| 7,032,251 B2 | 4/2006 | Janssen |
| 7,052,131 B2 | 5/2006 | McCabe |
| 7,091,283 B2 | 8/2006 | Müller |
| 7,160,953 B2 | 1/2007 | Bowers |
| 7,238,750 B2 | 7/2007 | Müller |
| 7,247,692 B2 | 7/2007 | Laredo |
| 7,249,848 B2 | 7/2007 | Laredo |
| 7,268,189 B2 | 9/2007 | Müller |
| 7,268,198 B2 | 9/2007 | Kunzler |
| 7,270,678 B2 | 9/2007 | Valint, Jr. |
| 7,297,725 B2 | 11/2007 | Winterton |
| 7,344,607 B2 | 3/2008 | Melzer |
| 7,360,890 B2 | 4/2008 | Back |
| 7,364,723 B1 | 4/2008 | Nakada |
| 7,384,590 B2 | 6/2008 | Kelly |
| 7,387,759 B2 | 6/2008 | Kelly |
| 7,396,890 B2 | 7/2008 | Zanini |
| 7,399,795 B2 | 7/2008 | Lai |
| 7,423,074 B2 | 9/2008 | Lai |
| 7,426,993 B2 | 9/2008 | Coldrey |
| 7,428,029 B2 | 9/2008 | Murakami |
| 7,429,558 B2 | 9/2008 | Batchelor |
| 7,429,623 B2 | 9/2008 | Molock |
| 7,435,452 B2 | 10/2008 | Shimoyama |
| 7,452,377 B2 | 11/2008 | Watling |
| 7,468,398 B2 | 12/2008 | Nicolson |
| 7,521,519 B1 | 4/2009 | Hirt |
| 7,538,146 B2 | 5/2009 | Nicolson |
| 7,540,609 B2 | 6/2009 | Chen |
| 7,553,880 B2 | 6/2009 | Nicolson |
| 7,556,858 B2 | 7/2009 | Rasmussen |
| 7,572,841 B2 | 8/2009 | Chen |
| 7,588,334 B2 | 9/2009 | Matsushita |
| 7,632,876 B2 | 12/2009 | Lai |
| 7,671,156 B2 | 3/2010 | Phelan |
| 7,691,917 B2 | 4/2010 | Lai |
| 7,726,809 B2 | 6/2010 | Filippo |
| 7,780,879 B2 | 8/2010 | Pruitt |
| 7,781,536 B2 | 8/2010 | Kamiya |
| 7,781,554 B2 | 8/2010 | Lai |
| 7,789,509 B2 | 9/2010 | Mentak |
| 7,832,856 B2 | 11/2010 | Vanderbilt |
| 7,841,716 B2 | 11/2010 | McCabe |
| 7,847,025 B2 | 12/2010 | Liu |
| 7,857,447 B2 | 12/2010 | Myung |
| 7,875,687 B2 | 1/2011 | Kunzler |
| 7,879,267 B2 | 2/2011 | Turner |
| 7,915,323 B2 | 3/2011 | Awasthi |
| 7,919,136 B2 | 4/2011 | Linhardt |
| 8,092,724 B2 | 1/2012 | Pruitt |
| 8,163,206 B2 | 4/2012 | Chang |
| 8,440,735 B2 | 5/2013 | Pruitt |
| 8,480,227 B2 * | 7/2013 | Qiu et al. .................. 351/159.33 |
| 8,529,057 B2 | 9/2013 | Qiu |
| 8,689,971 B2 | 4/2014 | Minick |
| 2001/0019762 A1 | 9/2001 | Nazarova |
| 2002/0120084 A1 | 8/2002 | Valint, Jr. |
| 2002/0149742 A1 | 10/2002 | Back |
| 2002/0182315 A1 | 12/2002 | Heiler |
| 2003/0039748 A1 | 2/2003 | Valint, Jr. |
| 2003/0143335 A1 | 7/2003 | Qiu |
| 2003/0175325 A1 | 9/2003 | Chatelier |
| 2003/0186825 A1 | 10/2003 | Mitani |
| 2004/0082680 A1 | 4/2004 | Phelan |
| 2004/0116564 A1 | 6/2004 | Devlin |
| 2004/0170752 A1 | 9/2004 | Luthra |
| 2005/0060812 A1 | 3/2005 | Batchelor |
| 2005/0113549 A1 | 5/2005 | Devlin |
| 2005/0228065 A1 | 10/2005 | Nicolson |
| 2006/0063852 A1 | 3/2006 | Iwata |
| 2006/0100113 A1 | 5/2006 | Pegram |
| 2006/0142410 A1 | 6/2006 | Baba |
| 2006/0217276 A1 | 9/2006 | Mitani |
| 2007/0037898 A1 | 2/2007 | Phelan |
| 2007/0066706 A1 | 3/2007 | Manesis |
| 2007/0105973 A1 | 5/2007 | Nicolson |
| 2007/0105974 A1 | 5/2007 | Nicolson |
| 2007/0122540 A1 | 5/2007 | Salamone |
| 2007/0149428 A1 | 6/2007 | Ammon, Jr. |
| 2007/0185281 A1 | 8/2007 | Song |
| 2007/0229758 A1 | 10/2007 | Matsuzawa |
| 2007/0296914 A1 | 12/2007 | Hong |
| 2008/0003259 A1 | 1/2008 | Salamone |
| 2008/0015315 A1 | 1/2008 | Chang |
| 2008/0017525 A1 | 1/2008 | Newman |
| 2008/0100796 A1 | 5/2008 | Pruitt |
| 2008/0110770 A1 | 5/2008 | Burke |
| 2008/0138310 A1 | 6/2008 | Ketelson |
| 2008/0142038 A1 | 6/2008 | Kunzler |
| 2008/0143003 A1 | 6/2008 | Phelan |
| 2008/0143957 A1 | 6/2008 | Linhardt |
| 2008/0143958 A1 | 6/2008 | Medina |
| 2008/0148689 A1 | 6/2008 | Xia |
| 2008/0152540 A1 | 6/2008 | Schorzman |
| 2008/0152800 A1 | 6/2008 | Bothe |
| 2008/0170201 A1 | 7/2008 | Filippo |
| 2008/0174035 A1 | 7/2008 | Winterton |
| 2008/0226922 A1 | 9/2008 | Ferreiro |
| 2008/0231798 A1 | 9/2008 | Zhou |
| 2008/0234457 A1 | 9/2008 | Zhou |
| 2008/0273168 A1 | 11/2008 | Rathore |
| 2008/0275156 A1 | 11/2008 | Laredo |
| 2008/0306455 A1 | 12/2008 | Dias |
| 2008/0307751 A1 | 12/2008 | Newman |
| 2008/0314767 A1 | 12/2008 | Lai |
| 2009/0036577 A1 | 2/2009 | Luo |
| 2009/0039535 A1 | 2/2009 | Nicolson |
| 2009/0046242 A1 | 2/2009 | Nicolson |
| 2009/0057164 A1 | 3/2009 | Minick |
| 2009/0100801 A1 | 4/2009 | Zhao |
| 2009/0111942 A1 | 4/2009 | Lang |
| 2009/0141234 A1 | 6/2009 | Blackwell |
| 2009/0142485 A1 | 6/2009 | Lai |
| 2009/0142508 A1 | 6/2009 | Lai |
| 2009/0145086 A1 | 6/2009 | Reynolds |
| 2009/0145091 A1 | 6/2009 | Connolly |
| 2009/0160074 A1 | 6/2009 | Pruitt |
| 2009/0168012 A1 | 7/2009 | Linhardt |
| 2009/0169716 A1 | 7/2009 | Linhardt |
| 2009/0171027 A1 | 7/2009 | Linhardt |

(56) References Cited

U.S. PATENT DOCUMENTS

| | | |
|---|---|---|
| 2009/0171049 A1 | 7/2009 | Linhardt |
| 2009/0171050 A1 | 7/2009 | Linhardt |
| 2009/0171459 A1 | 7/2009 | Linhardt |
| 2009/0173044 A1 | 7/2009 | Linhardt |
| 2009/0173045 A1 | 7/2009 | Lai |
| 2009/0173643 A1 | 7/2009 | Lai |
| 2009/0182067 A1 | 7/2009 | Liu |
| 2009/0186229 A1 | 7/2009 | Müller |
| 2009/0238948 A1 | 9/2009 | Muller |
| 2009/0264553 A1 | 10/2009 | Chen |
| 2009/0280157 A1 | 11/2009 | Maas |
| 2010/0029802 A1 | 2/2010 | Mehrabi |
| 2010/0048847 A1 | 2/2010 | Broad |
| 2010/0084775 A1 | 4/2010 | McCabe |
| 2010/0118261 A1 | 5/2010 | McGee |
| 2010/0127219 A1 | 5/2010 | Mohamed |
| 2010/0149482 A1 | 6/2010 | Ammon, Jr. |
| 2010/0152084 A1 | 6/2010 | Rathore |
| 2010/0162661 A1 | 7/2010 | Vanderbilt |
| 2010/0162663 A1 | 7/2010 | McGee |
| 2010/0225881 A1 | 9/2010 | Filippo |
| 2010/0238398 A1 | 9/2010 | Nicolson |
| 2010/0240776 A1 | 9/2010 | Filippo |
| 2010/0249356 A1 | 9/2010 | Rathore |
| 2010/0258961 A1 | 10/2010 | Chang |
| 2010/0276823 A1 | 11/2010 | Pruitt |
| 2010/0276824 A1 | 11/2010 | Pruitt |
| 2010/0296049 A1 | 11/2010 | Justynska |
| 2010/0298446 A1 | 11/2010 | Chang |
| 2010/0300902 A1 | 12/2010 | Marmo |
| 2011/0009519 A1 | 1/2011 | Awasthi |
| 2011/0009587 A1 | 1/2011 | Awasthi |
| 2011/0015298 A1 | 1/2011 | Schorzman |
| 2011/0102736 A1 | 5/2011 | Wu |
| 2011/0134387 A1 | 6/2011 | Samuel |
| 2012/0029111 A1 | 2/2012 | Chang |
| 2012/0112373 A1 | 5/2012 | Holland |
| 2012/0172478 A1 | 7/2012 | Chang |
| 2012/0177839 A1 | 7/2012 | Tucker |
| 2014/0100291 A1 | 4/2014 | Chang |
| 2014/0237945 A1 | 8/2014 | Minick |

FOREIGN PATENT DOCUMENTS

| | | |
|---|---|---|
| EP | 0362137 A2 | 4/1990 |
| EP | 0362145 A2 | 4/1990 |
| EP | 0393532 A2 | 10/1990 |
| EP | 0455323 A2 | 11/1991 |
| EP | 0480809 A2 | 4/1992 |
| EP | 0537972 A1 | 4/1993 |
| EP | 0574352 A1 | 12/1993 |
| EP | 0713106 A1 | 5/1996 |
| EP | 0728487 A1 | 8/1996 |
| EP | 0747071 A1 | 12/1996 |
| EP | 0751407 A2 | 1/1997 |
| EP | 0758687 A1 | 2/1997 |
| EP | 0780419 A1 | 6/1997 |
| EP | 0832618 A1 | 4/1998 |
| EP | 0940447 A2 | 9/1999 |
| EP | 0940693 A2 | 9/1999 |
| EP | 0963761 A1 | 12/1999 |
| EP | 958315 B1 | 6/2001 |
| EP | 932635 B1 | 7/2001 |
| EP | 961941 B1 | 4/2002 |
| EP | 1272353 B1 | 12/2003 |
| EP | 1287060 B1 | 11/2005 |
| EP | 1214383 B1 | 12/2005 |
| EP | 1149198 B1 | 4/2006 |
| EP | 1179190 B1 | 4/2006 |
| EP | 1153964 B1 | 7/2006 |
| EP | 1569702 B1 | 10/2006 |
| EP | 1754731 A1 | 2/2007 |
| EP | 1802357 B1 | 12/2009 |
| EP | 1945688 B1 | 12/2010 |
| JP | 61209275 A2 | 9/1986 |
| JP | 08239639 A | 9/1996 |
| WO | 8909246 A1 | 10/1989 |
| WO | 9104283 A1 | 4/1991 |
| WO | 9209639 A2 | 6/1992 |
| WO | 9209650 A1 | 6/1992 |
| WO | 9300391 A1 | 1/1993 |
| WO | 9406485 A1 | 3/1994 |
| WO | 9504609 A1 | 2/1995 |
| WO | 9618498 A1 | 6/1996 |
| WO | 9620796 A1 | 7/1996 |
| WO | 9624392 A1 | 8/1996 |
| WO | 9637241 A1 | 11/1996 |
| WO | 9700274 A1 | 1/1997 |
| WO | 9718904 A1 | 5/1997 |
| WO | 9721497 A1 | 6/1997 |
| WO | 9723532 A1 | 7/1997 |
| WO | 9729160 A1 | 8/1997 |
| WO | 9821270 A1 | 5/1998 |
| WO | 9828026 A1 | 7/1998 |
| WO | 9915917 A1 | 4/1999 |
| WO | 9935520 A1 | 7/1999 |
| WO | 0031150 A1 | 6/2000 |
| WO | 0037385 A1 | 6/2000 |
| WO | 0072052 A1 | 11/2000 |
| WO | 0157118 A2 | 8/2001 |
| WO | 03037960 A1 | 5/2003 |
| WO | 03059967 A1 | 7/2003 |
| WO | 03059967 A1 | 7/2003 |
| WO | 2004050132 A2 | 6/2004 |
| WO | 2005031400 A2 | 4/2005 |
| WO | 2006038080 A2 | 4/2006 |
| WO | 2006088758 A2 | 8/2006 |
| WO | 2007017243 A1 | 2/2007 |
| WO | 2008073193 A2 | 6/2008 |
| WO | 2008076506 A1 | 6/2008 |
| WO | 2008095955 A1 | 8/2008 |
| WO | 2009032122 A1 | 3/2009 |
| WO | 2009085902 A1 | 7/2009 |
| WO | 2010071691 A1 | 6/2010 |

OTHER PUBLICATIONS

Authors: N. Dilsiz and G. Akovali, Title: Plasma Polymerization of Selected Organic Compounds, Published: Polymer, (1996) vol. 37, No. 2, pp. 333-342.

Author: Frank Jansen, Ph.D., Title: Plasma Deposited Thin Films (Chapter 1), Published in: Plasma Deposition Processes (19), CRC Press (1986), Boca Raton, FL, Editors: F. Jansen and J. Mort, Ph.D.

Author: H. Yasuda, Title: Glow Discharge Polymerization, Published: Journal of Polymer Science: Macromolecular Reviews, vol. 16 (1981), pp. 199-293.

Author. D. M. Mattox, Title: The Application of Plasmas to Thin Film Deposition Processes, Published: Plasma-Surface Interactions and Processing of Materials, Kluwer Academic, Publishers in NATO ASI Series; Series E: Applied Scieces, vol. 176 (1990), pp. 377-399, Editors: O. Auciello, Alberto Gras-Marti, Jose Antonio Valles-Abarca, Daniel L. Flamm.

English Translation of Chinese Office Action, Chinese Patent Application for Invention No. 201180037428.8, Office Action Issue date: Dec. 19, 2013.

Authors: Kazuo Sugiyama and Koji Ohga, Title of Article: Surface modified poly(methyl methacrylate) with 1-methyl-2-methacrylamidoethyl phosphorylcholine moiety, Published: Macromol. Chem. Phys 200, No. 6 (1999) pp. 1439-1445.

Authors: Sean P. Cullen, Ian C. Mandel, and Padma Gopalan Title of article: Surace-Anchored Poly(2-vinyl-4,4-dimethyl azlactone) Brushes as Templates for Enzyme Immobilization Published: Langmuir, 2008 24 (23) pp. 13701-13709.

Authors: Joél Baguet, Françoise Sommer, Véronique Claudon-Eyl and Tran Minh Duc, \lame of Article: Characterization of lacrymal component accumulation on worn soft contact lens surfaces by atomic force microscopy, Published: Biomaterials 16 (1995) pp. 3-9.

Authors: Joél Baguet, Françoise Sommer, Tran Minh Duc, Name of Article: Imaging surfaces of hydrophilic contact lenses with the atomic force microscope, Published: Biomaterials 1993, vol. 14, No. 4, pp. 279-284.

(56) References Cited

OTHER PUBLICATIONS

Authors: Z.M. Jin and D. Dowson, Article: Elastohydrodynamic lubrication in biological systems, Published: Proc. IMechE (2005) vol. 219, Part J: J. Engineering Tribology pp. 367-380.

Author: Jeannine E. Elliott, Mara MacDonald, Jun Nie, Christopher N. Bowman, Article: Structure and swelling of poly(acrylic acid) hydrogels: effect of pH, ionic strength, and dilution on the cross-linked polymer structure, Published: Polymer 45 (2004) pp. 1503-1510.

Author: Niriam V. Flores-Merino, Somot Chirasatitsin, Caterina Lopresti, Gwendolen C. Reilly, Giuseppe Battaglia and Adam J. Engler, Article: Nanoscopic mechanical anisotropy in hydrogel surfaces, Published: The Royal Society of Chemistry 2010.

Authors: F. Formasiero, J.M. Prausnitz, C.J. Radke, Article: Post-lens tear-film depiction due to evaporative dehydration of a soft contact lens, Published: Journal of Membrane Science 275 (2006) pp. 229-243.

Authors: Francesco Fornasiero, Florian Krull, John M. Prausnitz, Clayton J. Radke, Article: Steady-state diffusion of water through soft-contact-lens materials, Published: Biomaterials 26 (2005) pp. 5704-5716.

Authors: Jian Ping Gong, Takayuki Kurokawa, Tetsuharu Narita, Go Kagata, Yoshihito Osada, Goro Nishimura and Masataka Kinjo, Article: Synthesis of Hydrogels with Extremely Low Surface Friction, Published: J. Am. Chem. Soc. 2001, 123 pp. 5582-5583.

Authors: J.M. González-Méijome, J.B. Almeida and M.A. Parafita, Article: Analysis of Surface Mechanical Properties of Unworn and Worn Silicone Hydrogel Contact Lenses Using Nanoindentation with AFM, Published: Microscopy: Science, Technology, Applications and Education, (Formutex 2010) pp. 554-559.

Authors: George L. Grobe III, Paul L. Valint, Jr. and Daniel M. Ammon, Jr., Article: Surface chemical structure for soft contact lenses as a function of polymer processing, Published: Journal of Biomedical Materials Research, vol. 32 pp. 45-54, 1996.

Authors: Murat Guvendiren, Jason A. Burdick, and Shu Yang, Article: Kinetic study of swelling-induced surface pattern formation and ordering in hydrogel films with depth-wise crosslinking gradient, Published: Soft matter, 2010, vol. 6, pp. 2044-2049.

Authors: Gavin Hoch, Anuj Chauhan, C.J. Radke, Article: Permeability and diffusivity for water transport through hydrogel membranes, Published: Journal of Membrane Science 214 (2003) 199-209.

Authors: R.E. Imhof, H.J.S. Birch, F.R. Thornley and J.R. Gilchrist, Article: Opto-thermal Transient Emission Radiometry: a New Surface Analysis Technique, Published: Analytical Proceedings, Jan. 1987, vol. 24, pp. 17-18.

Authors: L. Jones, C. May, L. Nazar, T. Simpson, Article: In vitro evaluation of the dehydration characteristics of silicone hydrogel and conventional hydrogel contact lens materials, Published: Contact Lens & Anterior Eye 25 (2002) pp. 147-156.

Authors: Lyndon Jones, Lakshman Subbaraman, Ronan Rogers, and Kathy Dumbleton, Article: Surface treatment, wetting and modulus of silicone hydrogels, Published: Contact Lens Monthly, Optician, Sep. 1, 2006, No. 6067, vol. 232, pp. 28-34.

Authors: Seong Han Kim, Aric Opdahl, Chris Marmo, Gabor A. Somorjai, Article: AFM and SFG studies of pHEMA-based hydrogel contact lens surfaces in saline solution: adhesion, friction, and the presence of non-crosslinked polymer chains at the surface, Published: Biomaterials 23 (2002) pp. 1657-1666.

Authors: Seong Han Kim, Chris Marmo, Gabor A. Somorjia, Article: Friction studies of hydrogel contact lenses using AFM: non-crosslinked polymers of low friction at the surface, Published: Biomaterials 22 (2001) pp. 3285-3294.

Authors: Gerald E. Lowther, Article: Hydrophilic Lens Inspection with Phase Contrast Microscopy, Published: American Journal of Optometry & Physiological Optics, vol. 58, No. 8, pp. 621-625, Aug. 1981.

Authors: M.D. Merindano, M. Canals, C. Saona and J. Costa, ArticleL Rigid gas permeable contact lenses surface roughness examined by interferential shifting phase and scanning electron microscopies, Published: Ophthal. Physiol. Opt. vol. 18, No. 1, pp. 75-92, 1998.

Authors: K.J. Stout, L. Blunt, Article: Nanometres to micrometres: three-dimensional surface measurement in bio-engineering, Published: Surface and Coatings Technology 71 (1995) pp. 69-81.

Authors: Oğuz Okay, Safiye B. Sariisik, Article: Swelling behavior of poly(acrylamide-co-sodium acrylate) hydrogels in aqueous salt solutions: theory versus experiments, Published: European Polymer Journal 36 (2000) pp. 393-399.

Authors: Sudi Patel, Waheeda Illahi, Arthur Davis, Article: Changes in water content of high plus hydrogel lenses worn on an extended wear basis in a geriatric aphakic population, Published: Contact Lens & Anterior Eye 28 (2005) pp. 127-134.

Authors: Carol E. Rabke, Paul L. Valint, Jr., and Daniel M. Ammon, Article: Ophthalmic Applications of Atomic Force Microscopy, Published: ICLC, vol. 22 Jan./Feb. 1995, pp. 32-41.

Authors: V. Rebelix, F. Sommer, B. Marchin, D. Baude, Tran Minh Duc, Article Artificial tear adsorption on soft contact lenses: methods to test surfactant efficacy, Published: Biomaterials, 21 (2000), pp. 1197-1205.

Authors: Ronan Rogers, Article: In vitro and ex vivo wettability of hydrogel contact lenses, Published: Thesis, University of Waterloo, Waterloo, Ontario, Canada, 2006.

Authors: F.M. Serry, Article: Applications of Atomic Force Microscopy for Contact Lens Manufacturing, Published: Veeco Instruments, Inc. (2004), www.veeco.com.

Authors: Christopher Snyder, OD, MS, FAAO, Article: A Primer on Contact Lens Materials, Published: http://www.clspectrum.com/references.asp; (2004) Contact Lens Spectrum, Document 102.

Authors: Kim Sweers, Kees Van der Werf, Martin Bennink and Vinod Subramaniam, Article: Nanomechanical properties of a-synuclein amyloid: a comparative study by nanoindentation, harmonic force microscopy, and Peakforce QNM, Published: Nanoscale Research Letters, 2011, 6:270, pp. 1-10.

Authors: Gareth Ross, Muriel Nasso, Val Franklin, Fiona Lydon and Brian Tighe, Article: Silicone Hydrogels: Trends in Products and Properties, Published: Biomaterials Research Unit, Aston University, Birmingham B4 7ET (2005).

Authors: David A. Tirrell, Doreen Y. Takigawa and Kenji Seki, Article: pH Sensitization of Phospholipid Vesicles via Complexation with Synthetic Poly(carboxylic acid)s, Published: Annals of the New York Academy of Sciences (1985), vol. 446, pp. 237-248.

Authors: Ioannis Tranoudis, Nathan Efron, Article: Water properties of soft contact lens materials, Published: Contact Lens & Anterior Eye 27 (2004) pp. 193-208.

Authors: Sean L. Willis, Jane L. Court, Richard P. Redman, Hin-Hai Wang, Simon W. Leppard, Wincent J. O'Byrne, Sharon A. Small, Andrew L. Lewis, Stephen A. Jones, Peter W. Stratford, Article: A novel phosphorylcholine-coated contact lens extended wear use, Published: Biomaterials 22 (2001) pp. 3261-3271.

Authors: Peng Xiao, Robert E. Imhof, Article: Opto-Thermal Skin Water Concentration Gradient Measurement, Published: School of EE & IE, South Bank University, (1996) vol. 2681, pp. 31-41.

PCT International Search Report dated Dec. 20, 2011, International Application No. PCT/US2011/045810, International Filing Date Jul. 29, 2011.

PCT Written Opinion of the International Searching Authority dated Dec. 20, 2011, International Application No. PCT/US2011/045810, International Filing Date Jul. 29, 2011.

English Translation of KIPO's Notice of Preliminary Rejection, Korean Patent Application No. 10-2014-7002071, Dated Aug. 4, 2015.

* cited by examiner

SILICONE HYDROGEL LENS WITH A CROSSLINKED HYDROPHILIC COATING

This application is a continuation of application Ser. No. 14/571,350 filed Dec. 16, 2014, which is a continuation of application Ser. No. 13/948,206 filed Jul. 23, 2013, now U.S. Pat. No. 8,944,592, which is a continuation of application Ser. No. 13/193,651 filed 29 Jul. 2011, now U.S. Pat. No. 8,529,057, which claims the benefits under 35 USC §119 (e) of U.S. provisional application Nos. 61/369,102 filed 30 Jul. 2010 and 61/448,478 filed 2 Mar. 2011, incorporated by reference in their entireties.

The present invention generally relates to a cost-effective and time-efficient method for applying a crosslinked hydrophilic coating onto a silicone hydrogel contact lens to improve its hydrophilicity and lubricity. In addition, the present invention provides an ophthalmic lens product.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb) utilize this approach in their production processes. Advantages of a plasma coating, such as, e.g., those may be found with Focus NIGHT & DAY™, are its durability, relatively high hydrophilicity/wettability), and low susceptibility to lipid and protein deposition and adsorption. But, plasma treatment of silicone hydrogel contact lenses may not be cost effective, because the preformed contact lenses must typically be dried before plasma treatment and because of relative high capital investment associated with plasma treatment equipment.

Another approach for modifying the surface hydrophilicity of a silicone hydrogel contact lens is the incorporation of wetting agents (hydrophilic polymers) into a lens formulation for making the silicone hydrogel contact lens as proposed in U.S. Pat. Nos. 6,367,929, 6,822,016, 7,052,131, and 7,249,848. This method may not require additional posterior processes for modifying the surface hydrophilicity of the lens after cast-molding of silicone hydrogel contact lenses. However, wetting agents may not be compatible with the silicone components in the lens formulation and the incompatibility may impart haziness to the resultant lenses. Further, such surface treatment may be susceptible to lipid deposition and adsorption. In addition, such surface treatment may not provide a durable surface for extended wear purposes.

A further approach for modifying the hydrophilicity of a relatively hydrophobic contact lens material is a layer-by-layer (LbL) polyionic material deposition technique (see for example, U.S. Pat. No. 6,451,871, U.S. Pat. No. 6,717,929, U.S. Pat. No. 6,793,973, U.S. Pat. No. 6,884,457, U.S. Pat. No. 6,896,926, U.S. Pat. No. 6,926,965, U.S. Pat. No. 6,940,580, and U.S. Pat. No. 7,297,725, and U.S. Patent Application Publication Nos. US 2007/0229758A1, US 2008/0174035A1, and US 2008/0152800A1). Although the LbL deposition technique can provide a cost effective process for rendering a silicone hydrogel material wettable, LbL coatings may not be as durable as plasma coatings and may have relatively high densities of surface charges; which may interfere with contact lens cleaning and disinfecting solutions. To improve the durability, crosslinking of LbL coatings on contact lenses has been proposed in commonly-owned copending US patent application publication Nos. 2008/0226922 A1 and 2009/0186229 A1 (incorporated by reference in their entireties). However, crosslinked LbL coatings may have a hydrophilicity and/or wettability inferior than original LbL coatings (prior to crosslinking) and still have relative high densities of surface charges.

A still further approach for modifying the hydrophilicity of a relatively hydrophobic contact lens material is to attach hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Patent Application Publication Nos. 2009/0145086 A1, 2009/0145091A1, 2008/0142038A1, and 2007/0122540A1, all of which are herein incorporated by reference in their entireties). Although those techniques can be use in rendering a silicone hydrogel material wettable, they may not be cost-effective and/or time-efficient for implementation in a mass production environment, because they typically require relatively long time and/or involve laborious, multiple steps to obtain a hydrophilic coating.

Therefore, there is still a need for a method of producing silicone hydrogel contact lenses with wettable and durable coating (surface) in a cost-effective and time-efficient manner.

SUMMARY OF THE INVENTION

The invention, in one aspect, provides a method for producing silicone hydrogel contact lenses each having a crosslinked hydrophilic coating thereon, the method of invention comprising the steps of: (a) obtaining a silicone hydrogel contact lens and a water-soluble and thermally-crosslinkable hydrophilic polymeric material, wherein the contact lens comprises amino and/or carboxyl groups on and/or near the surface of the contact lens, wherein the hydrophilic polymeric material comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains; and (b) heating the contact lens in an aqueous solution in the presence of the hydrophilic polymeric material to and at a temperature from about 40° C. to about 140° C. for a period of time sufficient to covalently attach the hydrophilic polymeric material onto the surface of the contact lens through second covalent linkages each formed between one azetidinium group of the hydrophilic polymeric material and one of the amino and/or carboxyl groups on and/or near the surface of the contact lens, thereby forming a crosslinked hydrophilic coating on the contact lens.

In another aspect, the invention provides a silicone hydrogel contact lens obtained according to a method of the invention, wherein the silicone hydrogel contact lens has an oxygen permeability of at least about 40 barrers, a surface wettability characterized by a water contact angle of about 100 degrees or less, and a good coating durability characterized by surviving a digital rubbing test.

In a further aspect, the invention provides an ophthalmic product, which comprises a sterilized and sealed lens package, wherein the lens package comprises: a post-autoclave lens packaging solution and a readily-usable silicone hydrogel contact lens immersed therein, wherein the readily-usable silicone hydrogel contact lens comprises a crosslinked hydrophilic coating obtained by autoclaving an original silicone hydrogel contact lens having amino groups and/or carboxyl groups on and/or near the surface of the original silicone hydrogel contact lens in a pre-autoclave packaging solution containing a water-soluble and thermally-crosslinkable hydrophilic polymeric material, wherein the hydrophilic polymeric material comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains, wherein the hydrophilic polymeric material is covalently attached onto the silicone hydrogel contact lens through second covalent linkages each formed between one amino or carboxyl group on and/or near the surface of the silicone hydrogel contact lens and one azetidinium group of the hydrophilic polymeric material, wherein the post-autoclave packaging solution comprises at least one buffering agent in an amount sufficient to maintain a pH of from about 6.0 to about 8.5 and an hydrolyzed product of the hydrophilic polymeric material and has a tonicity of from about 200 to about 450 milliosmol (mOsm) and a viscosity of from about 1 centipoise to about 20 centipoises.

In a still further aspect, the invention provides a water-soluble and thermally-crosslinkable hydrophilic polymeric material, which comprises: (a) from about 20% to about 95% by weight of first polymer chains derived from an epichlorohydrin-functionalized polyamine or polyamidoamine; (b) from about 5% to about 80% by weight of second polymer chains derived from at least one hydrophilicity-enhancing polymeric agent having at least one reactive functional group selected from the group consisting of amino group, carboxyl group, thiol group, and combination thereof, wherein the second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing polymeric agent; and (c) azetidinium groups which are parts of the first polymer chains or pendant or terminal groups covalently attached to the first polymer chains.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications, variations and combinations can be made in the present invention without departing from the scope or spirit of the invention. For instance, features illustrated or described as part of one embodiment, can be used on another embodiment to yield a still further embodiment. Thus, it is intended that the present invention cover such modifications, variations and combinations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "silicone hydrogel contact lens" refers to a contact lens comprising a silicone hydrogel material. A "silicone hydrogel" refers to a silicone-containing polymeric material which can absorb at least 10 percent by weight of water when it is fully hydrated and is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer", as used herein, refers to a compound that has one sole ethylenically unsaturated group and can be polymerized actinically or thermally.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

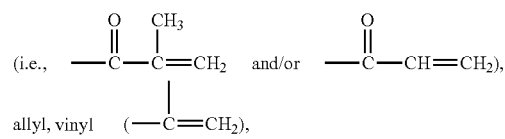

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water when fully hydrated.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains two or more ethylenically unsaturated groups. Medium and high molecular weight typically means average molecular weights greater than 700 Daltons.

A "crosslinker" refers to a compound having at least two ethylenically unsaturated groups. A "crosslinking agent" refers to a crosslinker having a molecular weight of about 700 Daltons or less.

A "polymer" means a material formed by polymerizing/crosslinking one or more monomers or macromers or prepolymers.

"Molecular weight" of a polymeric material (including monomeric or macromeric materials), as used herein, refers to the weight-average molecular weight unless otherwise specifically noted or unless testing conditions indicate otherwise.

The term "amino group" refers to a primary or secondary amino group of formula —NHR', where R' is hydrogen or a $C_1$-$C_{20}$ unsubstituted or substituted, linear or branched alkyl group, unless otherwise specifically noted.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

An "azetidinium group" refers to a positively charged group of

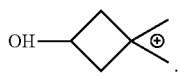

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The term "phosphorylcholine" refers to a zwitterionic group of

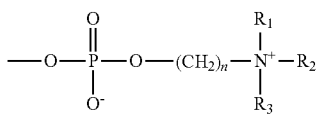

in which n is an integer of 1 to 5 and $R_1$, $R_2$ and $R_3$ independently of each other are $C_1$-$C_8$ alkyl or $C_1$-$C_8$ hydroxyalkyl.

The term "reactive vinylic monomer" refers to a vinylic monomer having a carboxyl group or an amino group (i.e., a primary or secondary amino group).

The term "non-reactive hydrophilic vinylic monomer" refers to a hydrophilic vinylic monomer which is free of any carboxyl group or amino group (i.e., primary or secondary amino group). A non-reactive vinylic monomer can include a tertiary or quaternary amino group.

The term "water-soluble" in reference to a polymer means that the polymer can be dissolved in water to an extent sufficient to form an aqueous solution of the polymer having a concentration of up to about 30% by weight at room temperature (defined above).

A "water contact angle" refers to an average water contact angle (i.e., contact angles measured by Sessile Drop method), which is obtained by averaging measurements of contact angles with at least 3 individual contact lenses.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a digital rubbing test.

As used herein, "surviving a digital rubbing test" or "surviving a durability test" in reference to a coating on a contact lens means that after digitally rubbing the lens according to a procedure described in Example 1, water contact angle on the digitally rubbed lens is still about 100 degrees or less, preferably about 90 degrees or less, more preferably about 80 degrees or less, most preferably about 70 degrees or less.

The intrinsic "oxygen permeability", Dk, of a material is the rate at which oxygen will pass through a material. In accordance with the invention, the term "oxygen permeability (Dk)" in reference to a hydrogel (silicone or non-silicone) or a contact lens means an oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The "ion permeability" through a lens correlates with the Ionoflux Diffusion Coefficient. The Ionoflux Diffusion Coefficient, D (in units of [$mm^2$/min]), is determined by applying Fick's law as follows:

$$D = -n'/(A \times dc/dx)$$

where n'=rate of ion transport [mol/min]; A=area of lens exposed [$mm^2$]; dc=concentration difference [mol/L]; dx=thickness of lens [mm].

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The invention is generally directed to a cost-effective and time-efficient method for making silicone hydrogel contact lenses with durable hydrophilic coatings by use of a water-soluble and thermally-crosslinkable hydrophilic polymeric material having azetidinium groups.

The invention is partly based on the surprising discoveries that a water-soluble, azetidinium-containing, and thermally-crosslinkable hydrophilic polymeric material, which is a partial reaction product of a polyamine-epichlorohydrin or polyamidoamine-epichlorohydrin with at least one hydrophilicity-enhancing agent having at least one reactive functional group selected from the group consisting of amino group, carboxyl group, thiol group, and combination thereof, can be used to form a crosslinked coating with a good surface hydrophilicity and/or wettability, a good hydrophilicity and a good intactness on a silicone hydrogel contact lens having carboxyl acid and/or amino groups at or near its surface. At a relatively elevated temperature (defined above), positively-charged azetidinium groups react with functional groups such as amino groups, thiol groups, and carboxylate ion —COO⁻ (i.e., the deprotonated form of a carboxyl group) to form neutral, hydroxyl-containing covalent linkages as illustrated in the scheme I Scheme I

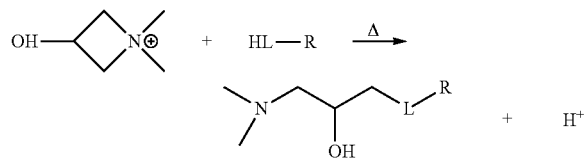

in which R is the rest portion of a compound, L is —NR'— in which R' is hydrogen, a $C_1$-$C_{20}$ unsubstituted or substituted, linear or branched alkyl group or a polymer chain —S—, or —OC(=O)—. Because of the thermally-controllable reactivity of azetidinium groups, polyamine-epichlorohydrin or polyamidoamine-epichlorohydrin (PAE) has been widely used as a wet-strengthening agent. However, PAE has not been successfully used to form crosslinked coatings on contact lenses, probably because crosslinked PAE coatings may not be able to impart desirable hydrophilicity, wettability, and lubricity to contact lenses. It is surprisingly discovered here that PAE can be chemically-modified with a hydrophilicity-enhancing agent (especially a hydrophilic polymer) having one or more functional groups each capable of reacting with one azetidinium group, in a "heat-pretreatment" or "pretreatment" process, to obtain a water-soluble, azetidinium-containing polymeric material.

Such polymeric material, which is still thermally-crosslinkable (reactive) due to the presence of azetidinium groups, can be used to form a crosslinked coating on a silicone hydrogel contact lens having reactive functional groups (e.g., amino groups, carboxyl groups, thiol groups, or combinations thereof) on and/or near its surface. And, it is surprised to discover that resultant crosslinked coatings on the contact lens, derived from the water-soluble, azetidinium-containing polymeric material, has an improved surface hydrophilicity, wettability and/or lubricity relative to a control coating obtained either by using an unmodified (original or starting) PAE alone or by using a mixture of PAE and a hydrophilicity-enhancing agent (without undergoing the heat pretreatment for preparing the water-soluble, azetidinium-containing polymeric material).

It is believed that a hydrophilicity-enhancing agent may play at least two roles in increasing the performance of resultant crosslinked coatings: adding hydrophilic polymer chains onto a polyamine or polyamidoamine polymer chain to form a highly-branched hydrophilic polymeric material with dangling polymer chains and/or chain segments; and decreasing the crosslinking density of the crosslinked coating by reducing significantly the number of azetidinium groups of the crosslinkable polymeric material (coating material). A coating with a loose structure and dangling polymer chains and/or chain segments is believed to impart a good surface hydrophilicity, wettability and/or lubricity.

The invention is also partly based on the discoveries that a crosslinked coating of the invention can be advantageously formed onto a silicone hydrogel contact lens directly in a lens package containing the contact lens immersed in a lens packaging solution in the presence of a water-soluble azetidinium-containing polymeric material. The presence of the azetidinium-containing polymeric material can be accomplished either by adding the azetidinium-containing polymeric material in the lens packaging solution, or by, prior to packaging, depositing physically a layer of the azetidinium-containing polymeric material onto the surface of a contact lens at room temperature.

Typically, contact lenses, which are hydrated and packaged in a packaging solution, must be sterilized. Sterilization of the hydrated lenses during manufacturing and packaging is typically accomplished by autoclaving. The autoclaving process involves heating the packaging of a contact lens to a temperature of from about 118° C. to about 125° C. for approximately 20-40 minutes under pressure. It is discovered that during autoclave, a water-soluble, azetidinium-containing polymeric material can be crosslinked effectively with the functional groups (e.g., amino groups, thiol groups, and/or carboxylic acid groups) on and/or near the surface of a silicone hydrogel contact lens to form a crosslinked coating which are wettable and ophthalmically compatible. It is believed that during autoclave those azetidinium groups which do not participate in crosslinking reaction may be hydrolyzed into 2,3-dihydroxypropyl (HO—$CH_2$—CH (OH)—$CH_2$—) groups and that the azetidinium-containing polymeric material present in the lens packaging solution, if applicable, can be converted to a non-reactive polymeric wetting material capable of improving a lens's insert comfort.

By using the method of the invention, the coating process can be combined with the sterilization step (autoclave) in the manufacturing of silicone hydrogel contact lenses. The resultant contact lenses not only can have a high surface hydrophilicity/wettability, no or minimal surface changes, good intactness, and good durability, but also can be used directly from the lens package by a patient without washing and/or rising because of the ophthalmic compatibility of the packaging solution.

The invention, in one aspect, provides a method for producing silicone hydrogel contact lenses each having a crosslinked hydrophilic coating thereon, the method of invention comprising the steps of: (a) obtaining a silicone hydrogel contact lens and a water-soluble and thermally-crosslinkable hydrophilic polymeric material, wherein the contact lens comprises amino and/or carboxyl groups on and/or near the surface of the contact lens, wherein the hydrophilic polymeric material comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains; and (b) heating the contact lens in an aqueous solution in the presence of the hydrophilic polymeric material to and at a temperature from about 40° C. to about 140° C. for a period of time sufficient to covalently attach the hydrophilic polymeric material onto the surface of the contact lens through second covalent linkages each formed between one azetidinium group of the hydrophilic polymeric material and one of the amino and/or carboxyl groups on and/or near the surface of the contact lens, thereby forming a crosslinked hydrophilic coating on the contact lens.

A person skilled in the art knows very well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810. In cast-molding, a lens formulation typically is dispensed into molds and cured (i.e., polymerized and/or crosslinked) in molds for making contact lenses. For production of silicone hydrogel contact lenses, a lens formulation for cast-molding generally comprises at least one components selected from the group consisting of a silicone-containing vinylic monomer, a silicone-containing vinylic macromer, a silicone-containing prepolymer, a hydrophilic vinylic monomer, a hydrophilic vinylic macromer, a hydrophobic vinylic monomer, and combination thereof, as well known to a person skilled in the art. A silicone hydrogel contact lens formulation can also comprise other necessary components known to a person skilled in the art, such as, for example, a crosslinking agent, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Molded silicone hydrogel contact lenses then can be subjected to extraction with an extraction solvent to remove unpolymerized components from the molded lenses and to hydration process, as known by a person skilled in the art. Numerous silicone hydrogel lens formulations have been described in numerous patents and patent applications published by the filing date of this application.

In accordance with the invention, a silicone hydrogel contact lens can either inherently comprise or be modified to comprise amino groups and/or carboxyl groups on and/or near its surface.

Where a silicone hydrogel contact lens inherently comprises amino groups and/or carboxyl groups on and/or near its surface, it is obtained by polymerizing a silicone hydrogel lens formulation comprising a reactive vinylic monomer.

Examples of preferred reactive vinylic monomers include without limitation amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, acrylic acid, $C_1$-$C_{12}$ alkylacrylic acid (e.g., methacrylic ethylacrylic acid, propylacrylic acid, butylacrylic acid, etc.), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof. Preferably, the silicone hydrogel contact lens is made from a lens formulation comprising at least one reactive vinylic monomer selected from the group consisting of amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, acrylic acid, $C_1$-$C_{12}$ alkylacrylic acid, N,N-2-acrylamidoglycolic acid, and combinations thereof. The lens formulation comprises preferably from about 0.1% to about 10%, more preferably from about 0.25% to about 7%, even more preferably from about 0.5% to about 5%, most preferably from about 0.75% to about 3%, by weight of the reactive vinylic monomer.

A silicone hydrogel contact lens can also be subjected either to a surface treatment to form a reactive base coating having amino groups and/or carboxyl groups on the surface of the contact lens. Examples of surface treatments include without limitation a surface treatment by energy (e.g., a plasma, a static electrical charge, irradiation, or other energy source), chemical treatments, chemical vapor deposition, the grafting of hydrophilic vinylic monomers or macromers onto the surface of an article, layer-by-layer coating ("LbL coating") obtained according to methods described in U.S. Pat. Nos. 6,451,871, 6,719,929, 6,793,973, 6,811,805, and 6,896,926 and in U.S. Patent Application Publication Nos. 2007/0229758A1, 2008/0152800A1, and 2008/0226922A1, (herein incorporated by references in their entireties). "LbL coating", as used herein, refers to a coating that is not covalently attached to the polymer matrix of a contact lens and is obtained through a layer-by-layer ("LbL") deposition of charged or chargeable (by protonation or deprotonation) and/or non-charged materials on the lens. An LbL coating can be composed of one or more layers.

Preferably, the surface treatment is an LbL coating process. In this preferred embodiment (i.e., the reactive LbL base coating embodiment), a resultant silicone hydrogel contact lens comprises a reactive LbL base coating including at least one layer of a reactive polymer (i.e., a polymer having pendant amino groups and/or carboxyl groups), wherein the reactive LbL base coating is obtained by contacting the contact lens with a solution of a reactive polymer. Contacting of a contact lens with a coating solution of a reactive polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

In accordance with this reactive LbL base coating embodiment, the reactive polymer can be a linear or branched polymer having pendant amino groups and/or carboxyl groups. Any polymers having pendant amino groups and/or carboxyl groups can be used as a reactive polymer for forming base coatings on silicone hydrogel contact lenses. Examples of such reactive polymers include without limitation: a homopolymer of a reactive vinylic monomer; a copolymer of two or more reactive vinylic monomers; a copolymer of a reactive vinylic monomer with one or more non-reactive hydrophilic vinylic monomers (i.e., hydrophilic vinylic monomers free of any carboxyl or (primary or secondary) amino group); polyethyleneimine (PEI); polyvinylalcohol with pendant amino groups; a carboxyl-containing cellulose (e.g., carboxymethylcellulose, carboxyethylcellulose, carboxypropylcellulose); hyaluronate; chondroitin sulfate; poly(glutamic acid); poly(aspartic acid); and combinations thereof.

Examples of preferred reactive vinylic monomers are those described previously, with carboxylic acid-containing vinylic monomers as most preferred reactive vinylic monomers for preparing reactive polymers for forming a reactive LbL base coating.

Preferred examples of non-reactive hydrophilic vinylic monomers free of carboxyl or amino group include without limitation acrylamide (AAm), methacrylamide N,N-dimethylacrylamide (DMA), N,N-dimethylmethacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropylmethacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer (including (meth)acryloyloxyethyl phosphorylcholine and those described in U.S. Pat. No. 5,461,433, herein incorporated by reference in its entirety), and combinations thereof.

Preferably, the reactive polymers for forming a reactive LbL base coating are polyacrylic acid, polymethacrylic acid, poly($C_2$-$C_{12}$ alkylacrylic acid), poly[acrylic acid-co-methacrylic acid], poly(N,N-2-acrylamidoglycolic acid), poly [(meth)acrylic acid-co-acrylamide], poly[(meth)acrylic acid-co-vinyl pyrrolidone], poly[$C_2$-$C_{12}$ alkylacrylic acid-co-acrylamide], poly[$C_2$-$C_{12}$ alkylacrylic acid-co-vinyl pyrrolidone], hydrolyzed poly[(meth)acrylic acid-co-vinylacetate], hydrolyzed poly[$C_2$-$C_{12}$ alkylacrylic acid-co-vinylacetate], polyethyleneimine (PEI), polyallylamine hydrochloride (PAH) homo- or copolymer, polyvinylamine homo- or copolymer, or combinations thereof.

The weight average molecular weight $M_w$ of a reactive polymer for forming a reactive LbL base coating is at least about 10,000 Daltons, preferably at least about 50,000 Daltons, more preferably from about 100,000 Daltons to about 5,000,000 Daltons.

A solution of a reactive polymer for forming a reactive LbL base coating on contact lenses can be prepared by dissolving one or more reactive polymers in water, a mixture of water and one or more organic solvents miscible with water, an organic solvent, or a mixture of one or more organic solvents. Preferably, the reactive polymer is dissolved in a mixture of water and one or more organic solvents, an organic solvent, or a mixture of one or more organic solvent. It is believed that a solvent system containing at least one organic solvent can swell a silicone hydrogel contact lens so that a portion of the reactive polymer may penetrate into the silicone hydrogel contact lens and increase the durability of the reactive base coating.

Any organic solvents can be used in preparation of a solution of the reactive polymer. Examples of preferred organic solvents include without limitation tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, methanol, ethanol, 1- or 2-propanol, 1- or 2-butanol, tert-butanol, tert-amyl alcohol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

In another preferred embodiment, a silicone hydrogel comprises inherently amino groups and/or carboxyl groups on and/or near its surface and is further subjected to a surface treatment to form a reactive LbL base coating having amino groups and/or carboxyl groups therein.

In another preferred embodiment (reactive plasma base coating), a silicone hydrogel contact lens is subjected to a plasma treatment to form a covalently-attached reactive plasma base coating on the contact lens, i.e., polymerizing one or more reactive vinylic monomers (any one of those described previously) under the effect of plasma generated by electric discharge (so-called plasma-induced polymerization). The term "plasma" denotes an ionized gas, e.g. created by electric glow discharge which may be composed of electrons, ions of either polarity, gas atoms and molecules in the ground or any higher state of any form of excitation, as well as of photons. It is often called "low temperature plasma". For a review of plasma polymerization and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341. Preferably, the plasma-induced polymerization is an "afterglow" plasma-induced polymerization as described in WO98028026 (herein incorporated by reference in its entirety). For "after-glow" plasma polymerization the surface of a contact lens is treated first with a non-polymerizable plasma gas (e.g. H2, He or Ar) and then in a subsequent step the surface thus activated is exposed to a vinylic monomer having an amino group or carboxyl group (any reactive vinylic monomer described above), while the plasma power having been switched off. The activation results in the plasma-induced formation of radicals on the surface which in the subsequent step initiate the polymerization of the vinylic monomer thereon.

In accordance with the invention, a water-soluble and thermally-crosslinkable hydrophilic polymeric material containing azetidinium groups comprises (i.e., has a composition including) from about 20% to about 95%, preferably from about 35% to about 90%, more preferably from about 50% to about 85%, by weight of first polymer chains derived from an epichlorohydrin-functionalized polyamine or polyamidoamine and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof. The composition of the hydrophilic polymeric material is determined by the composition (based on the total weight of the reactants) of a reactants mixture used for preparing the thermally-crosslinkable hydrophilic polymeric material according to the crosslinking reactions shown in Scheme I above. For example, if a reactant mixture comprises about 75% by weight of an epichlorohydrin-functionalized polyamine or polyamidoamine and about 25% by weight of at least one hydrophilicity-enhancing agent based on the total weight of the reactants, then the resultant hydrophilic polymeric material comprise about 75% by weight of first polymer chains derived from the epichlorohydrin-functionalized polyamine or polyamidoamine and about 25% by weight of hydrophilic moieties or second polymer chains derived from said at least one hydrophilicity-enhancing agent. The azetidinium groups of the thermally-crosslinkable hydrophilic polymeric material are those azetidinium groups (of the epichlorohydrin-functionalized polyamine or polyamidoamine) which do not participate in crosslinking reactions for preparing the thermally-crosslinkable hydrophilic polymeric material.

An epichlorohydrin-functionalized polyamine or polyamidoamine can be obtained by reacting epichlorohydrin with a polyamine polymer or a polymer containing primary or secondary amino groups. For example, a poly (alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer. Similarly, a homopolymer or copolymer of aminoalkyl(meth)acrylate, mono-alkylaminoalkyl (meth)acrylate, aminoalkyl(meth)acrylamide, or mono-alkylaminoalkyl (meth)acrylamide can also react with epichlorohydrin to form an epichlorohydrin-functionalized polyamine. The reaction conditions for epichlorohydrin-functionalization of a polyamine or polyamidoamine polymer are taught in EP1465931 (herein incorporated by reference in its entirety). A preferred epichlorohydrin-functionalized polymer is polyaminoamide-epichlorohydrin (PAE) (or polyamide-polyamine-epichlorohydrin or polyamide-epichlorohydrin), such as, for example, Kymene® or Polycup® resins (epichlorohydrin-functionalized adipic acid-diethylenetriamine copolymers) from Hercules or Polycup® or Servamine® resins from Servo/Delden.

Any suitable hydrophilicity-enhancing agents can be used in the invention so long as they contain at least one amino group, at least one carboxyl group, and/or at least one thiol group.

A preferred class of hydrophilicity-enhancing agents include without limitation: amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more amino, carboxyl and/or thiol groups. More preferably, the content of monomeric units having an amino (—NHR' with R' as defined above), carboxyl (—COOH) and/or thiol (—SH) group in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

Another preferred class of hydrophilic polymers as hydrophilicity-enhancing agents are amino- or carboxyl-containing polysaccharides, for example, such as, carboxymethylcellulose (having a carboxyl content of about 40% or less, which is estimated based on the composition of repeating units, $—[C_6H_{10-m}O_5(CH_2CO_2H)_m]—$ in which m is 1 to 3), carboxyethylcellulose (having a carboxyl content of about 36% or less, which is estimated based on the composition of repeating units, $—[C_6H_{10-m}O_5(C_2H_4CO_2H)_m]—$ in which m is 1 to 3) carboxypropylcellulose (having a carboxyl content of about 32% or less, which is estimated based on the composition of repeating units, $—[C_6H_{10-m}O_5(C_3H_6CO_2H)_m]—$, in which m is 1 to 3), hyaluronic acid (having a carboxyl content of about 11%, which is estimated based on the composition of repeating units, $—(C_{13}H_{20}O_9NCO_2H)—$), chondroitin sulfate (having a carboxyl content of about 9.8%, which is estimated based on the composition of repeating units, $—(C_{12}H_{18}O_{13}NS\,CO_2H)—$), or combinations thereof.

Another preferred class of hydrophilic polymers as hydrophilicity-enhancing agents include without limitation: poly(ethylene glycol) (PEG) with one sole amino, carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl and/or thiol groups; PEG dendrimers with one or more amino, carboxyl and/or thiol groups; a diamino- or dicarboxyl-terminated homo- or co-polymer of a non-reactive hydrophilic vinylic monomer; a monoamino- or monocarboxyl-terminated homo- or co-polymer of a non-reactive hydrophilic vinylic monomer; a copolymer which is a polymerization product of a composition comprising (1) about 50% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer and/or at least one phosphorylcholine-containing vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of (meth)acrylic acid, C$_2$-C$_{12}$ alkylacrylic acid, vinylamine, allylamine and/or amino-C$_2$-C$_4$ alkyl (meth)acrylate, and (2) (meth)acryloyloxyethyl phosphorylcholine and/or at least one non-reactive hydrophilic vinylic monomer selected from the group consisting of acryamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, and combination thereof.

Most preferably, the hydrophilicity-enhancing agent as a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of a carboxylic acid containing vinylic monomer and/or an amino-containing vinylic monomer; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or copolymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used herein, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer) can be prepared according to any well-known radical polymerization methods or obtained from commercial suppliers. Copolymers containing methacryloyloxyethyl phosphorylcholine and carboxyl-containing vinylic monomer can be obtained from NOP Corporation (e.g., LIPI-DURE®-A and -AF).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000.

In accordance with the invention, the reaction between a hydrophilicity-enhancing agent and an epichlorohydrin-functionalized polyamine or polyamidoamine is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

In accordance with the invention, the concentration of a hydrophilicity-enhancing agent relative to an epichlorohydrin-functionalized polyamine or polyamidoamine must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the epichlorohydrin-functionalized polyamine or polyamidoamine.

In accordance with the invention, the step of heating is performed preferably by autoclaving the silicone hydrogel contact lens immersed in a packaging solution (i.e., a buffered aqueous solution) in a sealed lens package at a temperature of from about 118° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinylpyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-ami noethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N, N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.2 centipoises to about 10 centipoises, more preferably from about 1.5 centipoises to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material of the invention.

A packaging solution of the invention can contain a viscosity-enhancing polymer. The viscosity-enhancing polymer preferably is nonionic. Increasing the solution viscosity provides a film on the lens which may facilitate comfortable wearing of the contact lens. The viscosity-enhancing component may also act to cushion the impact on the eye surface during insertion and serves also to alleviate eye irritation.

Preferred viscosity-enhancing polymers include, but are not limited to, water soluble cellulose ethers (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), water-soluble polyvinylalcohols (PVAs), high molecular weight poly(ethylene oxide) having a molecular weight greater than about 2000 (up to 10,000,000 Daltons), polyvinylpyrrolidone with a molecular weight of from about 30,000 daltons to about 1,000,000 daltons, a copolymer of N-vinylpyrrolidone and at least one dialkylaminoalkyl (meth)acrylate having 7-20 carbon atoms, and combinations thereof. Water soluble cellulose ethers and copolymers of vinylpyrrolidone and dimethylaminoethylmethacrylate are most preferred viscosity-enhancing polymers. Copolymers of N-vinylpyrrolidone and dimethylaminoethylmethacrylate are commercially available, e.g., Copolymer 845 and Copolymer 937 from ISP.

The viscosity-enhancing polymer is present in the packaging solution in an amount of from about 0.01% to about 5% by weight, preferably from about 0.05% to about 3% by weight, even more preferably from about 0.1% to about 1% by weight, based on the total amount of the packaging solution.

A packaging solution can further comprises a polyethylene glycol having a molecular weight of about 1200 or less, more preferably 600 or less, most preferably from about 100 to about 500 daltons.

Where at least one of the crosslinked coating and the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, an α-oxo-multi-acid is citric or malic acid or biocompatible (preferably ophthalmically compatible) salts thereof (e.g., sodium, potassium, or the like).

In accordance with the invention, the packaging solution can further comprises mucin-like materials, ophthalmically beneficial materials, and/or surfactants.

Exemplary mucin-like materials include without limitation polyglycolic acid, polylactides, and the likes. A mucin-like material can be used as guest materials which can be released continuously and slowly over extended period of time to the ocular surface of the eye for treating dry eye syndrome. The mucin-like material preferably is present in effective amounts.

Exemplary ophthalmically beneficial materials include without limitation 2-pyrrolidone-5-carboxylic acid (PCA), amino acids (e.g., taurine, glycine, etc.), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Surfactants can be virtually any ocularly acceptable surfactant including non-ionic, anionic, and amphoteric surfactants. Examples of preferred surfactants include without limitation poloxamers (e.g., Pluronic® F108, F88, F68, F68LF, F127, F87, F77, P85, P75, P104, and P84), poloamines (e.g., Tetronic® 707, 1107 and 1307, polyethylene glycol esters of fatty acids (e.g., Tween® 20, Tween® 80), polyoxyethylene or polyoxypropylene ethers of $C_{12}$-$C_{18}$ alkanes (e.g., Brij® 35), polyoxyethyene stearate (Myrj® 52), polyoxyethylene propylene glycol stearate (Atlas® G 2612), and amphoteric surfactants under the trade names Mirataine® and Miranol®.

A silicone hydrogel contact lens obtained according a method of the invention has a surface hydrophilicity/wettability characterized by having an averaged water contact angle of preferably about 90 degrees or less, more preferably about 80 degrees or less, even more preferably about 70 degrees or less, most preferably about 60 degrees or less.

In another preferred embodiment, a method of the invention can further comprise, before the step of heating, the steps of: contacting at room temperature the silicone hydrogel contact lens with an aqueous solution of the thermally-crosslinkable hydrophilic polymeric material to form a top layer (i.e., an LbL coating) of the thermally-crosslinkable hydrophilic polymeric material on the surface of the silicone hydrogel contact lens, immersing the silicone hydrogel contact lens with the top layer of the thermally-crosslinkable hydrophilic polymeric material in a packaging solution in a lens package; sealing the lens package; and autoclaving the lens package with the silicone hydrogel contact lens therein to form a crosslinked hydrophilic coating on the silicone hydrogel contact lens. Because of being positively charged, the thermally-crosslinkable hydrophilic polymeric material is believed to be capable of forming, on a silicone hydrogel contact lens, an LbL coating which is not covalently bound to the surface of a silicone hydrogel contact lens (i.e., through physical interactions), especially a contact lens having negatively-charged carboxyl groups on its surface.

It should be understood that although various embodiments including preferred embodiments of the invention may be separately described above, they can be combined and/or used together in any desirable fashion in the method of the invention for producing silicone hydrogel contact lenses each having a crosslinked hydrophilic coating thereon.

In another aspect, the invention provides a silicone hydrogel contact lens obtained according to a method of invention described above.

In a further aspect, the invention provides an ophthalmic product, which comprises a sterilized and sealed lens package, wherein the lens package comprises a post-autoclave lens packaging solution and a readily-usable silicone hydrogel contact lens immersed therein, wherein the readily-usable silicone hydrogel contact lens comprises a crosslinked hydrophilic coating obtained by autoclaving an original silicone hydrogel contact lens having amino groups and/or carboxyl groups on and/or near the surface of the original silicone hydrogel contact lens in a pre-autoclave packaging solution containing a water-soluble and thermally-crosslinkable hydrophilic polymeric material, wherein the hydrophilic polymeric material comprises (i) from about 20% to about 95%, preferably from about 35% to about 90%, more preferably from about 50% to about 85%, by weight of first polymer chains derived from an epichlorohydrin-functionalized polyamine or polyamidoamine, (ii) from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains, wherein the hydrophilic polymeric material is covalently attached onto the silicone hydrogel contact lens through first covalent linkages each formed between one amino or carboxyl group on and/or near the surface of the silicone hydrogel contact lens and one azetidinium group of the thermally-crosslinkable hydrophilic polymeric material, wherein the post-autoclave packaging solution comprises at least one buffering agent in an amount sufficient to maintain a pH of from about 6.0 to about 8.5 and has a tonicity of from about 200 to about 450 milliosmol (mOsm), preferably from about 250 to about 350 mOsm and a viscosity of from about 1 centipoise to about 20 centipoises, preferably from about 1.2 centipoises to about 10 centipoises, more preferably from about 1.5 centipoises to about 5 centipoises, at 25° C., wherein the post-autoclave packaging solution comprises a polymeric wetting material which is an hydrolyzed product of the thermally-crosslinkable hydrophilic polymeric material after autoclave, wherein the readily-usable silicone hydrogel contact lens has a surface hydrophilicity/wettability characterized by having an averaged water contact angle of about 90 degrees or less, preferably about 80 degrees or less, more preferably about 70 degrees or less, even more preferably about 60 degrees or less, most preferably about 50 degrees or less.

A "readily-usable silicone hydrogel contact lens" refers to a silicone hydrogel contact lens which is ophthalmically compatible and sterilized by autoclave. An "original silicone hydrogel contact lens" refers to a silicone hydrogel contact lens which lacks a crosslinked hydrophilic coating and is not sterilized by autoclave.

Various embodiments including preferred embodiments of silicone hydrogel contact lenses inherently having amino groups and/or carboxyl groups, silicone hydrogel contact lenses having a reactive base coating, reactive vinylic monomers, non-reactive vinylic monomers, reactive polymers for forming a reactive LbL base coating, plasma coatings, epichlorohydrin-functionalized polyamine or polyamidoamine, hydrophilicity enhancing agents, water-soluble hydrophilic polymeric materials with azetidinium groups, the step of heating, lens packages, packaging solutions, and surface wettability of a silicone hydrogel contact lens with a crosslinked hydrophilic coating of the invention are described above and can be combined and/or used together in these two aspects of the invention.

A readily-usable silicone hydrogel contact lens of the invention has an oxygen permeability of at least about 40 barrers, preferably at least about 50 barrers, more preferably at least about 60 barrers, even more preferably at least about 70 barrers; a center thickness of about 30 to about 200 microns, more preferably about 40 to about 150 microns, even more preferably about 50 to about 120 microns, and most preferably about 60 to about 110 microns; an elastic modulus of about 1.5 MPa or less, preferably about 1.2 MPa or less, more preferably about 1.0 or less, even more preferably from about 0.3 MPa to about 1.0 MPa; an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min; a water content of preferably from about 18% to about 70%, more preferably from about 20% to about 60% by weight when fully hydrated; or combinations thereof.

The water content of a silicone hydrogel contact lens can be measured according to Bulk Technique as disclosed in U.S. Pat. No. 5,849,811.

In a still further aspect, the invention provides a water-soluble and thermally-crosslinkable hydrophilic polymeric material, which comprises: (a) from about 20% to about 95%, preferably from about 35% to about 90%, more preferably from about 50% to about 85%, by weight of first polymer chains derived from an epichlorohydrin-functionalized polyamine or polyamidoamine; (b) from about 5% to about 80%, preferably from about 10% to about 65%, even more preferably from about 15% to about 50%, by weight of second polymer chains derived from at least one hydrophilicity-enhancing polymeric agent having at least one reactive functional group selected from the group consisting of amino group, carboxyl group, thiol group, and combination thereof, wherein the second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing polymeric agent; and (c) azetidinium groups which are parts of the first polymer chains or pendant groups covalently attached to the first polymer chains.

Various embodiments including preferred embodiments of reactive vinylic monomers, non-reactive vinylic monomers, epichlorohydrin-functionalized polyamine or polyamidoamine, and hydrophilic polymers as hydrophilicity-enhancing agents are described above and can be combined in any manner and/or used together in this aspect of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Example 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$-minute]

$$P_{oxygen} = (P_{measured} - P_{water} \text{ vapor}) = (\% \text{ O}_2 \text{ in air stream})[\text{mm Hg}] = \text{partial pressure of oxygen in the air stream}$$

$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)

$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference Iotrafilcon A (Focus® N&D® from CIBA VISION CORPORATION) or Iotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of Iotrafilcon A or Iotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum\left(\frac{t}{Dk_{app}} - \frac{t}{Dk_i}\right)}{n} \quad (1)$$

In which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for Iotrafilcon A=85 μm. The standard thickness for Iotrafilcon B=60 μm.

$$Dk_{a\_std} = t_{std}/[(t_{std}/Dk_c) + R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of 0.314×10$^{-3}$ mm$^2$/minute.

Lubricity Evaluation

The lubricity rating is a qualitative ranking scheme where a scale of 0 to 5 is used with 0 or lower numbers indicating better lubricity, 1 is assigned to Oasys™/TruEye™ commercial lenses and 5 is assigned to commercial Air Optix™ lenses. The samples are rinsed with excess DI water for at least three times and then transferred to PBS before the evaluation. Before the evaluation, hands are rinsed with a soap solution, extensively rinsed with DI water and then dried with KimWpe® towels. The samples are handled between the fingers and a numerical number is assigned for each sample relative to the above standard lenses described above. For example, if lenses are determined to be only slightly better than Air Optix™ lenses, then they are assigned a number 4. For consistency, all ratings are independently collected by the same two operators in order to avoid bias and the data so far reveal very good qualitative agreement and consistency in the evaluation.

Surface Hydrophilicity/Wetability Tests.

Water contact angle on a contact lens is a general measure of the surface hydrophilicity (or wetability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 µl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests.

The wettabilty of the lenses (after autoclave) is also assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT≥5 seconds are considered wettable and are expected to exhibit adequate wettability (ability to support the tear film) on-eye.

Coating Intactness Tests.

The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., SiHy contact lens). If the coating on a hydrophobic lens is intact, no staining spots should be observed on or in the lens. All of the lenses under test are fully hydrated.

Tests of Coating Durability.

The lenses are digitally rubbed with Solo-Care® multi-purpose lens care solution for 30 times and then rinsed with saline. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the coating is still intact. To survive digital rubbing test, there is no significantly increased staining spots (e.g., staining spots covering no more than about 5% of the total lens surface). Water contact angles are measured to determine the coating durability.

Debris Adhesion Test.

Contact lenses with a highly charged surface can be susceptible to increased debris adhesion during patient handling. A paper towel is rubbed against gloved hands and then both sides of the lens are rubbed with the fingers to transfer any debris to the lens surface. The lens is briefly rinsed and then observed under a microscope. A qualitative rating scale from 0 (no debris adhesion) to 4 (debris adhesion equivalent to a PAA coated control lens) is used to rate each lens. Lenses with a score of "0" or "1" are deemed to be acceptable.

Surface Cracking Test.

Excessive crosslinking of a coating layer can lead to surface cracks after rubbing a lens which are visible under a darkfield microscope. Lenses are inverted and rubbed and any cracking lines are noted. A qualitative rating of 0 (no cracking) to 2 (severe cracking) is used to rate the lenses. Any severe cracking lines are deemed unacceptable.

Determination of Azetidinium Content.

The azetidinium content in PAE can be determined according to one of the following assays.

PPVS Assays.

PAE charge density (i.e., azetidinium content) can be determined according to PPVS assay, a colorimetric titration assay where the titrant is potassium vinyl sulfate (PPVS) and Toluidine Blue is the indicator. See, S-K Kam and J. Gregory, "Charge determination of synthetic cationic polyelectrolytes by colloid titration," in Colloid & Surface A: Physicochem. Eng. Aspect, 159: 165-179 (1999). PPVS binds positively-charged species, e.g., Toluidine Blue and the azetidinium groups of PAE. Decreases in Toluidine Blue absorbance intensities are indicative of proportionate PAE charge density (azetidinium content).

PES-Na Assay.

PES-Na assay is another colorimetric titration assay for determining PAE charge density (azetidinium content). In this assay, the titrant is Sodium-polyethylensulphonate (PES-Na) instead of PPVS. The assay is identical to the PPVS assay described above.

PCD Assays.

PCD assay is a potentiometric titration assay for determining PAE charge density (azetidinium content). The titrant is Sodium-polyethylensulphonate (PES-Na), PPVS or other titrant. PAE charge is detected by an electrode, for example using the Mütek PCD-04 Particle Charge Detector from BTG. The measuring principle of this detector can be found in BTG's website http://www.btg.com/products.asp?langage=1&appli=5&numProd=357&cat=prod).

NMR Method.

Active positively charged moieties in PAE is azetidinium groups (AZRs). The NMR ratio method is a ratio of the number of AZR-specific protons versus the number of non-AZR related protons. This ratio is an indicator of the charge or AZR density for PAE.

Example 2

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL.

The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (CE-PDMS macromer).

Alternate Preparation of CE-PDMS Macromer 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Example 3

Preparation of Lens Formulations

A lens formulation is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of quartz (or $CaF_2$) and a male mold half made of glass (or PMMA). The UV irradiation source is a Hamamatsu lamp with the WG335+TM297 cut off filter at an intensity of about 4 mW/cm². The lens formulation in the mold is irradiated with UV irradiation for about 25 seconds. Cast-molded lenses are extracted with isopropanol (or methyl ethyl ketone, MEK), rinsed in water, coated with polyacrylic acid (PAA) by dipping lenses in a propanol solution of PAA (0.1% by weight, acidified with formic acid to about pH 2.5), and hydrated in water. Resultant lenses having a reactive PAA-LbL base coating thereon are determined to have the following properties: ion permeability of about 8.0 to about 9.0 relative to Alsacon lens material; apparent Dk (single point) of about 90 to 100; a water content of about 30% to about 33%; and an elastic modulus of about 0.60 MPa to about 0.65 MPa.

Example 4

An in-package coating (IPC) saline is prepared by adding 0.2% polyamidoamine-epichlorohydrin (PAE, Kymene) in phosphate buffer saline (PBS) and the pH is then adjusted to 7.2-7.4.

Lenses from Example 3 are placed in a polypropylene lens packaging shell with 0.6 mL of the IPC saline (half of the IPC saline is added prior to inserting the lens). The blister is then sealed with foil and autoclaved for about 30 minutes at 121° C., forming crosslinked coatings (PAA-x-PAE coating) on the lenses.

Then the lenses are evaluated for debris adhesion, surface cracking, lubricity, contact angle and water break-up time (WBUT). The test lenses (packaged/autoclaved in the IPC saline, i.e., lenses having PAA-x-PAE coating thereon) show no debris adhesion while control lenses (packaged/autoclaved in PBS, i.e., lenses having a PAA-LbL base coating thereon) show severe debris adhesion. The water contact angle (WCA) of the test lenses is low (~20 degrees) but the WBUT is less than 2 seconds. When observed under dark field microscope, severe cracking lines are visible after handling the lens (lens inversion and rubbing between the fingers). The test lenses are much less lubricous than the control lenses as judged by a qualitative finger-rubbing test (lubricity rating of 4).

Example 5

Poly(acrylamide-co-acrylic acid) partial sodium salt (~80% solid content, Poly(AAm-co-AA)(80/20), Mw. 520,000, Mn 150,000) is purchased from Aldrich and used as received.

An IPC saline is prepared by dissolving 0.02% of Poly(AAm-co-AA)(80/20) and 0.2% of PAE (Kymene) in PBS. The pH is adjusted to 7.2~7.4. PBS is prepared by dissolving 0.76% NaCl, 0.044% $NaH_2PO_4.H_2O$ and 0.388% $Na_2HPO_4.2H_2O$ in water.

Lenses having a PAA-LbL base coating thereon prepared in Example 3 are placed in a polypropylene lens packaging shell with 0.6 mL of the IPC saline (half of the saline is added prior to inserting the lens). The blister is then sealed with foil and autoclaved for about 30 minutes at about 121° C. It is believed that a crosslinked coating composed of three layers PAA-x-PAE-x-poly(AAm-co-AA) is formed on the lenses during autoclave.

The test lenses (packaged/autoclaved in the IPC saline, i.e., lenses having PAA-x-PAE-x-poly(AAm-co-AA) coating thereon) have no debris adhesion and have a WBUT of longer than 10 seconds. When observed under dark field microscope, cracking lines are visible after rubbing the test lenses. The test lenses are much more lubricous than the test lenses from Example 4 but still not as lubricous as the control lenses packaged in PBS (lubricity rating of 1-2).

Example 6

An IPC saline is prepared by dissolving 0.02% of poly(AAm-co-AA) (80/20) and 0.2% of PAE (Kymene) in PBS and adjusting the pH to 7.2~7.4. The saline is then treated by heating to and at about 70° C. for 4 hours (heat pre-treatment), forming a water-soluble and thermally-crosslinkable hydrophilic polymeric material containing azetidinium groups in the IPC saline. After the heat pre-treatment, the IPC saline is filtered using a 0.22 micron polyether sulphone (PES) membrane filter and cooled down back to room temperature.

Lenses having a PAA-LbL base coating thereon prepared in Example 3 are placed in a polypropylene lens packaging shell with 0.6 mL of the IPC saline (half of the saline is added prior to inserting the lens). The blister is then sealed with foil and autoclaved for about 30 minutes at about 121° C., forming a crosslinked coating (PAA-x-hydrophilic polymeric material) on the lenses.

The test lenses (packaged in the heat-pretreated IPC saline, i.e., lenses having PAA-x-hydrophilic polymeric material coating thereon) show no debris adhesion after being rubbed against paper towel while the control lenses (packaged in PBS, i.e., lenses having a non-covalently attached layer of PAA thereon) show severe debris adhesion. The test lenses have a WBUT of longer than 10 seconds. When observed under dark field microscope, no cracking lines are visible after rubbing the test lens. The test lenses are very lubricious in a finger rubbing test and equivalent to the control lenses (lubricity rating of 0).

A series of experiments are carried out to study the effects of the conditions (duration and/or temperature) of heat pre-treatment of the IPC saline upon the surface properties of resultant lenses coated with the IPC saline. Depending on the azetidinium functionality of the PAE and the concentration of PAE used, heat treatment times of about 6 hours or longer at about 70° C. result in lenses that are susceptible to debris adhesion similar to the control lenses. Heat treatment for only 4 hours at 50° C. results in lenses that show surface cracking lines under dark field microscopy after being rubbed between the fingers similar to the test lenses in Example 5 where the IPC saline is not heat pre-treated.

Example 7

Poly(acrylamide-co-acrylic acid) partial sodium salt (~90% solid content, poly(AAm-co-AA) 90/10, Mw 200,000) is purchased from Polysciences, Inc. and used as received.

An IPC saline is prepared by dissolving 0.07% of PAAm-PAA (90/10) and 0.2% of PAE (Kymene) in PBS and adjusting the pH to 7.2~7.4. Then the saline is heat pre-treated for about 4 hours at about 70° C., forming a water-soluble and thermally-crosslinkable hydrophilic polymeric material containing azetidinium groups. After the heat pre-treatment, the IPC saline is filtered using a 0.22 micron polyether sulphone [PES] membrane filter and cooled down back to room temperature.

Lenses having a PAA-LbL base coating thereon prepared in Example 3 and uncoated Lotrafilcon B lenses (from CIBA VISION CORPORATION) that are dipped into an acidic propanol solution of PAA (ca. 0.1%, pH~2.5) are placed in a polypropylene lens packaging shells with 0.6 mL of the heat-pretreated IPC saline (half of the IPC saline is added prior to inserting the lens). The blister is then sealed with foil and autoclaved for about 30 minutes at about 121° C., forming a crosslinked coating (PAA-x-hydrophilic polymeric material) on the lenses.

The test lenses (both Lotrafilcon B and Example 3 lenses having a PAA-x-hydrophilic polymer thereon) have no debris adhesion. The test lenses have a WBUT of longer than 10 seconds. When observed under dark field microscope, cracking lines are not visible after rubbing the lenses between the fingers. The lenses are extremely lubricous in qualitative finger rubbing tests (lubricity rating of 0).

Example 8

In design of experiments (DOE), IPC salines are produced to contain from between about 0.05% and about 0.09% PAAm-PAA and from about 0.075% to about 0.19% PAE (Kymene) in PBS. The IPC salines are heat-treated for 8 hours at 60° C. and lenses from Example 3 are packaged in the heat-pretreated IPC salines. No differences in the final lens surface properties are observed and all lenses showed excellent lubricity, resistance to debris adhesion, excellent wettability, and no evidence of surface cracking.

Example 9

In design of experiments (DOE), IPC salines are produced to contain about 0.07% PAAm-PAA and sufficient PAE to provide an initial azetidinium content of approximately 9 millimole equivalents/Liter (~0.15% PAE). The heat pre-treatment conditions are varied in a central composite design from 50° C. to 70° C. and the pre-reaction time is varied from about 4 to about 12 hours. A 24 hour pre-treatment time at 60° C. is also tested. 10 ppm hydrogen peroxide is then added to the salines to prevent bioburden growth and the IPC salines are filtered using a 0.22 micron polyether sulphone [PES] membrane filter.

Lenses from Example 3 are packaged in the heat-pretreated IPC salines and the blisters are then autoclaved for 45 minutes at 121° C. All lenses have excellent lubricity, wettability, and resistance to surface cracking. Some of the lenses show debris adhesion from paper towels as indicated in Table 1.

TABLE 1

| Time (hrs) | Temperature (° C.) | | | | |
|---|---|---|---|---|---|
| | 50 | 55 | 60 | 65 | 70 |
| 4 | | | pass | | |
| 6 | | pass | | pass | |
| 8 | pass | | pass | | fail |
| 10 | | pass | | fail | |
| 12 | | | pass | | |
| 24 | | | | | fail |

Example 10

Copolymers of methacryloyloxyethyl phosphorylcholine (MPC) with one carboxyl-containing vinylic monomer ($CH_2$=$CH(CH_3)C(O)OC_2H_4OC(O)C_2H_4COOH$ (MS), methacrylic acid (MA)) in the absence or presence of butylmethacrylate (BMA) are evaluated in an in-package coating systems in combination with PAE.

PBS containing NaCl (0.75% by weight), $NaH_2PO_4.H_2O$ (0.0536% by weight), $Na_2HPO_4.2H_2O$ (0.3576% by weight) and DI water (97.59% by weight) is prepared and 0.2% PAE (polycup 3160) is added. The pH is adjusted to about 7.3.

0.25% of one of several MPC copolymers is then added to form an IPC saline and the IPC saline is heat pre-treated at 70° C. for 4 hours, forming a water-soluble thermally crosslinkable hydrophilic polymeric material containing azetidinium groups. After 4 hours, the heat-pretreated IPC saline is filtered through 0.2 micron Polyether sulphone [PES} membrane filters (Fisher Scientific catalog#09-741-04, Thermo Scientific nalgene #568-0020 (250 ml).

Lenses having a PAA-LbL base coating thereon prepared in Example 3 are packaged in the heat-pretreated IPC saline and autoclaved for about 30 minutes at 121° C. Table 2 shows that all lenses possess excellent surface properties.

TABLE 2

| MPC Copolymer* | D.A. | Cracking | Lubricity | Wettability WBUT[1] |
|---|---|---|---|---|
| Poly(MPC/MA) 90/10 | pass | pass | excellent | excellent |
| Poly(MPC/BMA/MA) 40/40/20 | pass | pass | excellent | excellent |
| Poly(MPC/BMA/MA) 70/20/10 | pass | pass | excellent | excellent |
| Poly(MPC/BMA/MS) 70/20/10 | pass | pass | excellent | excellent |

*The numbers are molar percents of monomer units in the copolymer.
D.A. = Debris Adhesion
[1]"Excellent" means that WBUT is 10 seconds or longer.

Example 11

PAA-Coated Lenses.

Lenses cast-molded from a lens formulation prepared in Example 3 according to the molding process described in Example 3 are extracted and coated by dipping in the following series of baths: 3 MEK baths (22, 78 and 224 seconds); DI water bath (56 seconds); 2 baths of PAA coating solution (prepared by dissolving 3.6 g of PAA (M.W.: 450 kDa, from Lubrizol) in 975 ml of 1-propanol and 25 ml of formic acid) for 44 and 56 seconds separately; and 3 DI water baths each for 56 seconds.

PAE/PAA-Coated Lenses.

The above-prepared lenses with a PAA base coating thereon are dipped successively into the following baths: 2 baths of PAE coating solution, which is prepared by dissolving 0.25 wt % of PAE (Polycup 172, from Hercules) in DI water and adjusting the pH to about 5.0 using sodium hydroxide and finally filtering the resultant solution using a 5 um filter, for 44 and 56 seconds respectively; and 3 baths of DI water each for 56 seconds. After this treatment, the lenses have one layer of PAA and one layer of PAE.

Lenses with PAA-x-PAE-x-CMC Coatings Thereon.

One batch of lenses with one layer of PAA and one layer of PAE thereon are packaged in a 0.2% Sodium carboxymethylcellulose (CMC, Product#7H 3SF PH, Ashland Aqualon) in phosphate buffer saline (PBS) and the pH is then adjusted to 7.2-7.4. The blisters are then sealed and autoclaved for about 30 minutes at 121 C, forming crosslinked coatings (PAA-x-PAE-x-CMC) on the lenses.

Lenses with PAA-x-PAE-x-HA Coatings Thereon.

Another batch of lenses with one layer of PAA and one layer of PAE thereon are packaged in 0.2% Hyaluronic acid (HA, Product#6915004, Novozymes) in phosphate buffer saline (PBS) and the pH is then adjusted to 7.2-7.4. The blisters are then sealed and autoclaved for about 30 minutes at 121 C, forming crosslinked coatings (PAA-x-PAE-x-HA) on the lenses.

The resultant lenses either with PAA-x-PAE-x-CMC coating or with PAA-x-PAE-x-HA coating thereon show no Sudan black staining, no debris adhesion, and no cracking under microscopy examination. The lenses with PAA-x-PAE-x-CMC coating thereon have an average contact angle of 30±3 degrees, while the lenses PAA-x-PAE-x-HA coating thereon have an average contact angle of with 20±3 degrees.

Example 12

IPC Solution Preparation

A reaction mixture is prepared by dissolving 2.86% by weight of methoxy-poly (ethyleneglycol)-thiol, avg Mw 2000 (Product #MPEG-SH-2000, Laysan Bio Inc.) along with 2% by weight of PAE (Kymene) in PBS and the final pH adjusted to 7.5. The solution is heat-treated for about 4 hours at 45° C. forming a thermally crosslinkable hydrophilic polymeric material containing MPEG-SH-2000 groups chemically grafted onto the polymer by reaction with the Azetidinium groups in PAE. After the heat-treatment, the solution is diluted 10-fold with PBS containing 0.25% sodium citrate, pH adjusted to 7.2~7.4, and then filtered using 0.22 micron polyether sulphone (PES) membrane filter. The final IPC saline contains 0.286% by weight of hydrophilic polymeric material (consisting of about 59% by weight of MPEG-SH-2000 chains and about 41% by weight of PAE chains) and 0.25% Sodium citrate. PBS is prepared by dissolving 0.74% NaCl, 0.053% $NaH_2PO_4.H_2O$ and 0.353% $Na_2HPO_4.2H_2O$ in water.

Lenses with Crosslinked Coatings Thereon.

PAA-coated lenses from Example 11 are packaged in the above IPC saline in polypropylene lens packaging shells and then autoclaved for about 30 minutes at about 121° C., forming a crosslinked coating on the lenses. The final lenses show no debris adhesion, no cracking lines after rubbing the lens. The lenses are very lubricious in a finger rubbing test comparable to control PAA-coated lenses.

A series of experiments are carried out to study the effects of the conditions (reaction time and solution concentration of mPEG-SH2000 (with constant PAE concentration 2%) upon the surface properties of the resultant lenses coated with the IPC saline. The results are shown in Table 3.

TABLE 3

| [mPEG-SH2000][1] | Reaction time @ 45° C. | | | Lubricity | | |
|---|---|---|---|---|---|---|
| (wt %) | (hr) | D.A. | Cracking | Test 1 | Test 2 | WCA |
| 2.86 | 0 | 0, 2 | 0, 2; 2, NA | 3 | 3 | 17 |
| 2.86 | 0.5 | 0, 0 | 0, 2; 0, 2 | 2-3 | 2 | 21 |
| 2.86 | 2 | 0, 0 | 0, 0; 0, 0 | 2 | 2 | 20 |
| 2.86 | 4 | 0, 0 | 0, 0; 0, 0 | 1-2 | 1 | 37 |
| 0.5 | 4 | 0 | 0, 2; NA | 4 | 3-4 | 15 |
| 1.5 | 4 | 0 | 0, 0; NA | 3 | 3 | 20 |
| 6 | 4 | 0 | 0, 0; NA | 0-1 | 0 | 51 |

D.A. = debris adhesion;
WCA = water contact angle.
[1]PAE concentration: 2% by weight.

As the solution concentration of mPEG-SH 2000 increases, the lens lubricity increases accordingly. It is believed that the increase in the contact angle of the surface may be due to the increasing density of terminal methyl groups on the surface with increasing grafting density. At high grafting densities, corresponding to a solution concentration of 0.6%, the contact angle approaches measurements obtained on Polyethylene glycol (PEG) monolayer grafted flat substrates (Reference: *Langmuir* 2008, 24, 10646-10653).

Example 13

A series of experiments are carried out to study the effects of molecular weight of the mPEG-SH. The IPC saline is prepared similar to the procedure described in Example 12, but using one of the following mPEGSH: mPEG-SH 1000, mPEG-SH 2000, mPEG-SH 5000 and mPEG-SH 20000. All the salines are subjected to heat treatment at 45° C. for 4 hours and 10-fold dilution. The results and the reaction conditions are shown in Table 4.

TABLE 4

| mPEG-SH | | | | Lubricity | | |
|---|---|---|---|---|---|---|
| M.W. (Daltons) | Conc. (%)* | D.A. | Cracking | Test 1 | Test 2 | WCA |
| 1000 | 1.5 | No | No | 2 | 1 | 21 |
| 1000 | 2.86 | No | No | 1 | 1 | 27 |
| 2000 | 1.5 | No | No | 2 | 2 | 28 |
| 2000 | 2.86 | No | No | 0-1 | 0 | 21 |
| 5000 | 1.5 | No | No | 2 | 2 | 18 |
| 5000 | 2.86 | No | No | 0-1 | 0-1 | 26 |
| 20000 | 1.5 | No | No | 3 | 2 | 21 |
| 20000 | 2.86 | No | No | 2 | 1 | 21 |

D.A. = debris adhesion;
WCA = water contact angle.
*The initial concentration of MPEG-SH in the IPC saline with 2% PAE therein before the heat pretreatment and the 10-fold dilution.

Example 14

A reaction mixture is prepared by dissolving 2.5% of Methoxy-Poly (Ethylene Glycol)-Thiol, Avg MW 2000 (Product #MPEG-SH-2000, Laysan Bio Inc.), 10% of PAE (Kymene) in PBS and 0.25% of sodium citrate dihydrate. The pH of this final solution is then adjusted to 7.5 and also degassed to minimize thiol oxidation by bubbling nitrogen gas through the container for 2 hours. This solution is later heat treated for about 6 hours at 45° C. forming a thermally crosslinkable hydrophilic polymeric material containing MPEG-SH-2000 groups chemically grafted onto the polymer by reaction with the Azetidinium groups in PAE. After the heat-treatment, the solution is diluted 50-fold using PBS containing 0.25% sodium citrate, pH adjusted to 7.2~7.4, and then filtered using 0.22 micron polyether sulphone (PES) membrane filter. The final IPC saline contains about 0.30% by weight of the polymeric material (consisting of about 17% wt.MPEG-SH-2000 and about 83% wt. PAE) and 0.25% Sodium citrate dihydrate.

PAA-coated lenses from Example 11 are packaged in the above IPC saline in polypropylene lens packaging shells and then autoclaved for about 30 minutes at about 121° C., forming a crosslinked coating on the lenses.

The final lenses show no debris adhesion, no cracking lines after rubbing the lens. The test lenses are very lubricious in a finger rubbing test comparable to control PAA-coated lenses.

Example 15

A reaction mixture is prepared by dissolving 3.62% of Methoxy-Poly (Ethylene Glycol)-Amine, Avg MW 550 (Product #MPEG-NH2-550, Laysan Bio Inc.) along with 2% of PAE (Kymene) in PBS and the final pH adjusted to 10. The solution is heat-treated for about 4 hours at 45° C. forming a thermally crosslinkable hydrophilic polymeric material containing MPEG-NH2-550 groups chemically grafted onto the polymer by reaction with the Azetidinium groups in PAE. After the heat-treatment, the solution is diluted with 10-fold PBS containing 0.25% sodium citrate, pH adjusted to 7.2~7.4, and then filtered using 0.22 micron polyether sulphone (PES) membrane filter. The final IPC saline contains about 0.562% wt. of polymeric material (consisting of 64% wt. MPEG-SH-2000 and about 36% wt. PAE) and 0.25% Sodium citrate dihydrate. The PBS is prepared by dissolving 0.74% Sodium chloride, 0.053% $NaH_2PO_4.H_2O$ and 0.353% $Na_2HPO_4.2H_2O$ in water.

PAA-coated lenses from Example 11 are packaged in the above IPC saline in polypropylene lens packaging shells and then autoclaved for about 30 minutes at about 121° C., forming a crosslinked coating on the lenses.

The final lenses show no debris adhesion and no cracking lines after rubbing the lens.

Example 16

Poloxamer 108 (sample) and nelfilcon A (CIBA VISION) are used as received. Nelfilcon A is a polymerizable polyvinyl alcohol obtained by modifying a polyvinyl alcohol (e.g., Gohsenol KL-03 from Nippon Gohsei or the like) with N-(2,2-Dimethoxyethyl)acrylamide under cyclic-acetal formation reaction conditions (Buhler et al., CHIMIA, 53 (1999), 269-274, herein incorporated by reference in its entirety). About 2.5% of vinyl alcohol units in nelfilcon A is modified by N-(2,2-Dimethoxyethyl)acrylamide.

IPC saline is prepared by dissolving 0.004% poloxamer 108, 0.8% nelfilcon A, 0.2% PAE (Kymene, Polycup 3160), 0.45% NaCl, and 1.1% $Na_2HPO_4.2H_2O$ in DI water. The saline is heat pre-treated by stirring for 2 hrs at about 65-70° C. After heated pre-treatment, the saline is allowed to cool to room temperature and then filtered using a 0.2 μm PES filter.

Lenses prepared in Example 3 are placed in a polypropylene lens packaging shell with 0.6 mL of the IPC saline (half of the saline is added prior to inserting the lens). The blister is then sealed with foil and autoclaved for about 30 minutes at 121° C.

The test lenses show no debris adhesion after being rubbed against paper towel. The lenses had a WBUT of above 10 seconds. When observed under dark foiled microscope, cracking lines are not visible after rubbing the lenses between the fingers. The lens is much more lubricous than the lenses from Example 4 but still not as lubricous as the control lenses packaged in PBS.

Example 17

A. Synthesis of 80% Ethylenically-Functionalized Chain-Extended Polysiloxane

KF-6001A (α,ω-bis(2-hydroxyethoxypropyl)-polydimethylsiloxane, Mn=2000, from Shin-Etsu) and KF-6002A (α,ω-bis(2-hydroxyethoxypropyl)-polydimethylsiloxane, Mn=3400, from Shin-Etsu) are separately dried at about 60° C. for 12 hours (or overnight) under high vacuum in a single neck flask. The OH molar equivalent weights of KF-6001A and KF-6002A are determined by titration of hydroxyl groups and are used to calculate the millimolar equivalent to be used in the synthesis.

A one-liter reaction vessel is evacuated overnight to remove moisture, and the vacuum broken with dry nitrogen. 75.00 g (75 meq) of dried KF6001A is charged to the reactor, and then 16.68 g (150 meq) of freshly distilled IPDI is added into the reactor. The reactor is purged with nitrogen and heated to 45° C. with stirring and then 0.30 g of DBTDL is added. The reactor is sealed, and a positive flow of nitrogen is maintained. An exotherm occurs, after which the reaction mixture is allowed to cool and stir at 55° C. for 2 hours. After reaching the exotherm, 248.00 g (150 meq) of dried KF6002A is added to the reactor at 55° C. and then 100 μL of DBTDL is added. The reactor is stirred for four hours. Heating is discontinued and the reactor is allowed to cool overnight. The nitrogen bubble is discontinued and the reactor is opened to atmosphere for 30 minutes with moderate stirring. A hydroxyl-terminated chain-extended polysiloxane having 3 polysiloxane segments, HO-PDMS-IPDI-PDMS-IPDI-PDMS-OH (or HO-CE-PDMS-OH), is formed.

For 80% ethylenically-functionalized polysiloxane, 18.64 g (120 meq) of IEM is added to the reactor, along with 100 µL of DBTDL. The reactor is stirred for 24 hours, and then product (80% IEM-capped CE-PDMS) is decanted and stored under refrigeration.

B: Synthesis of Non-UV-Absorbing Amphiphilic Branched Polysiloxane Prepolymer A 1-L jacketed reactor is equipped with 500-mL addition funnel, overhead stirring, reflux condenser with nitrogen/vacuum inlet adapter, thermometer, and sampling adapter. The reactor is charged with 45.6 g of 80% IEM-capped CE-PDMS prepared above and sealed. A solution of 0.65 g of hydroxyethyl methacrylate (HEMA), 25.80 g of DMA, 27.80 g of (tris(trimethylsilyl))-siloxypropyl)methacrylate (TRIS), in 279 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C. While heating, a solution of 1.50 g of mercaptoethanol (chain transfer agent, CTA) and 0.26 g of azoisobutyronitrile dissolved in 39 g of ethyl acetate is charged to the addition funnel and deoxygenated three times at 100 mbar, RT for 10 minutes. When the reactor temperature reaches 67° C., the initiator/CTA solution is added to the PDMS/monomer solution in the reactor. The reaction is allowed to proceed for 8 hours, and then heating is discontinued and reactor temperature is brought to room temperature within 15 minutes.

The resultant reaction mixture then is siphoned to a dry single-neck flask with airtight lid, and 4.452 g of IEM is added with 0.21 g of DBTDL. The mixture is stirred 24 hs at room temperature, forming non-UV-absorbing amphiphilic branched polysiloxane prepolymer. To this mixture solution, 100 uL of hydroxy-tetramethylene piperonyloxy solution in ethyl acetate (2 g/20 mL) is added. The solution is then concentrated to 200 g (~50%) using rota-yap at 30° C. and filtered through 1 um pore size filter paper. After solvent exchange to 1-propanol, the solution is further concentrated to the desired concentration.

C. Synthesis of UV-Absorbing Amphiphilic Branched Polysiloxane Prepolymer

A 1-L jacketed reactor is equipped with 500-mL addition funnel, overhead stirring, reflux condenser with nitrogen/vacuum inlet adapter, thermometer, and sampling adapter. The reactor is then charged with 45.98 g of 80% IEM-capped CE-PDMS prepared above and the reactor is sealed. A solution of 0.512 g of HEMA, 25.354 g of DMA, 1.38 g of Norbloc methacrylate, 26.034 g of TRIS, in 263 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C. While heating, a solution of 1.480 g of mercaptoethanol (chain transfer agent, CTA) and 0.260 g of azoisobutyronitrile dissolved in 38 g of ethyl acetate is charged to the addition funnel and deoxygenated three times at 100 mbar, room temperature for 10 minutes. When the reactor temperature reaches 67° C., the initiator/CTA solution is added to the PDMS/monomer solution in the reactor. The reaction is allowed to proceed for 8 hours, and then heating is discontinued and reactor temperature is brought to room temperature within 15 minutes.

The resultant reaction mixture then is siphoned to a dry single-neck flask with airtight lid, and 3.841 g of isocyanatoethyl acrylate is added with 0.15 g of DBTDL. The mixture is stirred for about 24 hours at room temperature, forming a UV-absorbing amphiphilic branched polysiloxane prepolymer. To this mixture solution, 100 uL of hydroxy-tetramethylene piperonyloxy solution in ethyl acetate (2 g/20 mL) is added. The solution is then concentrated to 200 g (~50%) using rota-yap at 30° C. and filtered through 1 um pore size filter paper.

D-1: Lens Formulation with Non-UV-Absorbing Polysiloxane Prepolymer

In a 100 mL amber flask, 4.31 g of synthesized macromer solution prepared in Example C-2 (82.39% in 1-propanol) is added. In a 20 mL vial, 0.081 g of TPO and 0.045 g of DMPC are dissolved in 10 g of 1-propanol and then transferred to the macromer solution. After the mixture is concentrated to 5.64 g using rota-yap at 30° C., 0.36 g of DMA is added and the formulation is homogenized at room temperature. 6 g of clear lens formulation D-1 is obtained.

D-2: Lens Formulation with UV-Absorbing Polysiloxane Prepolymer (4% DMA)

In a 100 mL amber flask, 24.250 g of macromer solution prepared in Example D-2 (43.92% in ethyl acetate) is added. In a 50 mL vial, 0.15 g of TPO and 0.75 g of DMPC is dissolved in 20 g of 1-propanol and then transferred to the macromer solution. 20 g of solvent is pulled off using rota-yap at 30° C., followed by addition of 20 g of 1-propanol. After two cycles, the mixture is concentrated to 14.40 g. 0.6 g of DMA is added to this mixture and the formulation is homogenized at room temperature. 15 g of clear lens formulation D-2 is obtained.

D-3: Lens Formulation with UV-Absorbing Polysiloxane Prepolymer (2% DMA/2% HEA)

In a 100 mL amber flask, 24.250 g of macromer solution prepared in Example D-2 (43.92% in ethyl acetate) is added. In a 50 mL vial, 0.15 g of TPO and 0.75 g of DMPC is dissolved in 20 g of 1-propanol and then transferred to the macromer solution. 20 g of solvent is pulled off using rota-yap at 30° C., followed by addition of 20 g of 1-propanol. After two cycles, the mixture is concentrated to 14.40 g. 0.3 g of DMA and 0.3 g of HEA is added to this mixture and the formulation is homogenized at room temperature. 15 g of clear lens formulation D-3 is obtained.

Example 18

E: Covalent Attachment of Modified PAE Coating Polymers

Monomers containing amine groups, N-(3-Aminopropyl) methacrylamide hydrochloride (APMAA-HCl) or N-(2- aminoethyl)methacrylamide hydrochloride (AEMAA-HCl) are purchased from Polysciences and used as received. Poly(amidoamine epichlorohydrine) (PAE) is received from Ashland as an aqueous solution and used as received. Poly(acrylamide-co-acrylic acid) (poly(AAm-co-AA) (90/10) from Polysciences, mPEG-SH from Laysan Bio, and poly(MPC-co-AeMA) (i.e., a copolymer of methacryloyloxyethyl phosphorylcholine (MPC) and aminoethylmethacrylate (AeMA)) from NOF are used as received.

APMAA-HCl monomer is dissolved in methanol and added to the lens formulations D-1, D-2 and D-3 (prepared in Example 17) to achieve a 1 wt % concentration.

Reactive packaging saline is prepared by dissolving the components listed in Table 5 along with appropriate buffer salts in DI water. After heated pre-treatment, the saline is allowed to cool to room temperature and then filtered using a 0.2 μm PES filter.

TABLE 5

| Package Saline Sample | 1 | 2 | 3 | 4 | 5 |
|---|---|---|---|---|---|
| pH | 7.4 | 7.4 | 7.4 | 8 | 8 |
| PAE | 0.2% | 0.2% | 0.2% | 0.2% | 0.2% |
| Poly(AAm-co-AA) (90/10) | 0.07% | 0.2% | — | — | — |
| mPEG-SH, Mw = 2000 | — | — | 0.3% | — | — |
| mPEG-SH, Mw = 10000 | — | — | — | 0.2% | — |
| Poly(MPC-Co-AeMA) (90/10) | — | — | — | — | 0.2% |
| Pre-reaction condition | 70° C., 4 h | 70° C., 4 h | 45° C., 4 h | 45° C., 4 h | 65° C., 2 h |

Lens formulation D-1, D-2 and D3 prepared in Example 17 is modified by addition of the APMAA-HCl monomer (stock solution of APMMA-HCL in methanol). DSM lens is cured at 16 mW/cm$^2$ with 330 nm filter while LS lens is cured at 4.6 mW/cm$^2$ with 380 nm filter.

DSM Lenses.

Female portions of polypropylene lens molds are filled with about 75 microliters of a lens formulation prepared as above, and the molds are closed with the male portion of the polypropylene lens molds (base curve molds). Contact lenses are obtained by curing the closed molds for about 5 minutes with an UV irradiation source (Hamamatsu lamp with a 330 nm-cut-off filter at an intensity of about 16 mW/cm$^2$.

LS Lenses.

LS lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of quartz (or CaF$_2$) and a male mold half made of glass (or PMMA). The UV irradiation source is a Hamamatsu lamp with a 380 nm-cut-off filter at an intensity of about 4.6 mW/cm$^2$. The lens formulation in the mold is irradiated with UV irradiation for about 30 seconds.

Lens formulation D-1 modified with APMAA-HCl is cured according to DSM and LS methods described above, while with lens formulation D-2 or D-3 is cured according to the LS method described above.

Molded lenses are extracted in methyl ethyl ketone, hydrated, and packaged in one of the salines described in Table 5. Lenses are placed in a polypropylene lens packaging shell with 0.6 mL of the IPC saline (half of the saline is added prior to inserting the lens). The blister is then sealed with foil and autoclaved for 30 min at 121° C.

Evaluation of the lens surface shows that all test lenses had no debris adhesion. When observed under dark-field microscope, cracking lines are not visible after rubbing the lenses between the fingers.

The lens surface wettability (WBUT), lubricity, and contact angle are measured and results are summarized in Table 6. The lenses are made according DSM method unless specified otherwise. Lubricity is rated against a qualitative scale from 0 to 4 where lower numbers indicate greater lubricity. In general, lens surface properties are somewhat improved after application of the in-package coating

TABLE 6

| Lens formulation for making lenses | Saline[1] | WBUT (second) | Lubricity | Contact Angle [°] |
|---|---|---|---|---|
| D1 as control (free of APMAA) | 1 | 0 | 4-5 | 114 |
|  | 3 | 0 | 4 | 119 |
| D1 w/1% APMAA | 1 | 10 | 0-1 | 104 |
|  | 3 | 2 | 0-1 | 99 |
| D2 as control (free of APMAA) | 1 | 0 | 4-5 | 115 |
|  | 3 | 0 | 3 | 107 |
|  | 4 | 0[2] | 3-4[2] | 116[2] |
| D2 w/1% APMAA | 1 | 5 | 2-3 | 90 |
|  | 3 | 6 | 1 | 95 |
|  | 4 | 5-10[2] | 3[2] | 106[2] |
| D3 as control (free of APMAA) | 1 | 1[2] | 3-4[2] | 105[2] |
|  | 2 | 5[2] | 3-4[2] | 94[2] |
|  | 3 | 0[2] | 3[2] | 112[2] |
|  | 4 | 12[2] | 3[2] | 36[2] |
|  | 5 | 4[2] | 3[2] | 102[2] |
| D3 w/1% APMAA | 1 | 0[2] | 4[2] | 103[2] |
|  | 2 | 9[2] | 3-4[2] | 97[2] |
|  | 3 | 14[2] | 2-3[2] | 91[2] |
|  | 4 | 15[2] | 3[2] | 54[2] |
|  | 5 | 13[2] | 2[2] | 69[2] |

[1]The number is the packaging saline number shown in Table 5.
[2]LS lenses.

Example 19

Lenses are fabricated using lens formulation D-2 (Example 17) to which APMAA monomer has been added to a concentration of 1%. LS lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of glass and a male mold half made of quartz. The UV irradiation source is a Hamamatsu lamp with a 380 nm-cut-off filter at an intensity of about 4.6 mW/cm$^2$. The lens formulation in the mold is irradiated with UV irradiation for about 30 seconds.

Cast-molded lenses are extracted with methyl ethyl ketone (MEK), rinsed in water, coated with polyacrylic acid (PAA) by dipping lenses in a propanol solution of PAA (0.0044% by weight, acidified with formic acid to about pH 2.5), and hydrated in water.

IPC Saline is prepared according to the composition described in Example 9 with pre-reaction conditions of 8 hrs at approximately 60° C. Lenses are placed in a polypropylene lens packaging shell with 0.6 mL of the IPC saline (half of the saline is added prior to inserting the lens). The blister is then sealed with foil and autoclaved for 30 min at 121° C.

Evaluation of the lens surface shows that all test lenses have no debris adhesion. When observed under dark-field microscope, cracking lines are not visible after rubbing the lenses between the fingers. The lens surface wettability (WBUT) is greater than 10 seconds, lubricity is rated as "1", and contact angle is approximately 20°.

Example 20

Preparation of Lens Formulations

A lens formulation is prepared by dissolving components in 1-propanol to have the following composition: about 32% by weight of CE-PDMS macromer prepared in Example 2, about 21% by weight of TRIS-Am, about 23% by weight of DMA, about 0.6% by weight of L-PEG, about 1% by weight of DC1173, about 0.1% by weight of visitint (5% copper phthalocyanine blue pigment dispersion in TRIS), about 0.8% by weight of DMPC, about 200 ppm H-tempo, and about 22% by weight of 1-propanol.

Preparation of Lenses.

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds.

PAA-Coating Solution.

A PAA coating solution is prepared by dissolving an amount of PAA (M.W.: 450 kDa, from Lubrizol) in a given volume of 1-propanol to have a concentration of about 0.36-0.44% by weight and the pH is adjusted with formic acid to about 1.7-2.3.

PAA-Coated Lenses.

Cast-molded contact lenses as above are extracted and coated by dipping in the following series of baths: DI water bath (about 56 seconds); 6 MEK baths (about 44, 56, 56, 56, 56, and 56 second respectively); DI water bath (about 56 seconds); one bath of PAA coating solution (about 0.36-0.44% by weight, acidified with formic acid to about pH 1.7-2.3) in 100% 1-propanol (about 44 seconds); one bath of a water/1-propanol 50%/50% mixture (about 56 seconds); 4 DI water baths each for about 56 seconds; one PBS bath for about 56 seconds; and one DI water bath for about 56 seconds.

IPC Saline.

Poly(AAm-co-AA)(90/10) partial sodium salt (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An IPC saline is prepared by dissolving about 0.07% w/w of poly(AAm-co-AA)(90/10) and about 0.15% of PAE (an initial azetidinium millimolar equivalents of about 8.8 millimole) in PBS (about 0.044 w/w % $NaH_2PO_4.H_2O$, about 0.388 w/w/% $Na_2HPO_4.2H_2O$, about 0.79 w/w % NaCl) and adjusting the pH to 7.2~7.4. Then the IPC saline is heat pre-treated for about 4 hours at about 70° C. (heat pretreatment) During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. 10 ppm hydrogen peroxide is then added to the final IPC saline to prevent bioburden growth and the IPC saline is filtered using a 0.22 micron PES membrane filter.

Application of Crosslinked Coating.

Lenses having a PAA-LbL base coating thereon prepared above are placed in polypropylene lens packaging shells (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked coatings (PAA-x-hydrophilic polymeric material) thereon.

Characterization of SiHy Lenses.

The resultant SiHy contact lenses with crosslinked coatings (PAA-x-hydrophilic polymeric material) thereon show no debris adhesion after being rubbed against paper towel while the control lenses (packaged in PBS, i.e., lenses having a non-covalently attached layer of PAA thereon) show severe debris adhesion. The lenses have an oxygen permebility ($Dk_c$ or estimated intrinsic Dk) of about 146 barrers, a bulk elastic modulus of about 0.76 MPa, a water content of about 32% by weight, a relative ion permeability of about 6 (relative to Alsacon lens), a contact angle of from about 34 to 47 degrees, a WBUT of longer than 10 seconds. When observed under dark field microscope, no cracking lines are visible after rubbing the test lens. The lenses are very lubricious in a finger rubbing test and equivalent to the control lenses.

Example 21

SiHy lenses and IPC salines in lens packages after autoclave, which are prepared in Examples 6, 14 and 20, are subjected to following biocompatibility studies.

In-Vitro Cytotoxicity Evaluation.

SiHy lenses are evaluated by the USP Direct Contact Material Assay. Lens extracts are evaluated by the USP MEM Elution and ISO CEN Cell Growth Inhibition Assay, and the IPC saline in the packages after autoclave is evaluated by a Modified Elution test. All lens and lens extracts evaluated are well within acceptance criteria for each test and no unacceptable cytotoxicity is observed.

In-Vivo Testing.

ISO Systemic Toxicity in the Mouse shows that there is no evidence of systemic toxicity in the mouse with extracts of lenses. ISO Ocular Irritation Study in the Rabbit shows that extracts of lenses are not considered irritants to the ocular tissue of the rabbit. ISO Ocular Irritation Study in the Rabbit shows that the IPC saline in the packages after autoclave is not considered an irritant to the ocular tissue of the rabbit. Lenses worn in a daily disposable wear mode for 22 consecutive days are nonirritating to the rabbit model, and eyes treated with test lenses are similar to eyes treated with the control lenses. ISO Sensitization Study (Guinea Pig Maximization Testing of Packaging Solutions) shows that the IPC saline after autoclave do not cause any delayed dermal contact sensitization in the guinea pig. ISO Sensitization Study (Guinea Pig Maximization Testing of Lens Extracts) shows that Sodium chloride and sesame oil extracts of the lenses do not cause delayed dermal contact sensitization in the guinea pig.

Genotoxicity Testing.

When IPC salines from the lens packages and SiHy lens extracts are tested in Bacterial Reverse Mutation Assay (Ames Test), it is ofund that the lens extracts and IPC salines are considered to be nonmutagenic to *Salmonella typhimurium* test strains TA98, TA100, TA1535 and TA1537 and to *Escherichia coli* WPuvrA. When SiHy lens extracts are tested in Mammalian Erythrocyte Micronucleus Assay, they have no clastogenic activity and to be negative in the mouse bone marrow micronucleus test. When IPC salines from the lens packages are tested according to Chromosome Aberration Test in Chinese Hamster Ovary, the IPC salines are negative for the induction of structural and numerical chromosome aberrations assays using CHO cells in both non-activated and S9-activated test systems. When SiHy lens extracts are tested according to Cell Gene Mutation Test (Mouse Lymphoma Mutagenesis Assay), the lens extracts are shown to be negative in the Mouse Lymphoma Mutagenesis Assay.

Example 22

The surface compositions of preformed SiHy contact lenses (i.e., SiHy contact lens without any coating and prior to applying the PAA base coating), SiHy contact lenses with PAA coating (i.e., those lenses before being sealed and autoclaved in lens packages with the IPC saline), and SiHy contact lenses with a crosslinked coating thereon, all of which are prepared according to the procedures described in Example 20, are determined by characterizing vacuum dried contact lenses with X-ray photoelectron spectroscopy (XPS). XPS is a method for measuring the surface composition of lenses with a sampling depth of about 10 nm. The surface compositions of three types of lenses are reported in Table 7.

TABLE 7

| SiHy Lens | Surface Atomic Composition (%) | | | | |
|---|---|---|---|---|---|
| | C | N | O | F* | Si |
| Preformed (without coating) | 58.0 | 6.2 | 23.0 | 0.8 | 12.1 |
| With PAA coating | 48.9 | 1.6 | 42.1 | 2.9 | 4.5 |
| With crosslinked coating | 59.1 | 10.8 | 25.4 | 3.2 | 1.4 |

*Fluorine is detected, mostly likely from surface contamination during vacuum drying process XPS analysis Table 7 shows that when a PAA coating is applied onto a SiHy lens (preformed without coating), the carbon and oxygen atomic composition is close to those of PAA (60% C and 40% 0) and the silicon atomic composition is substantially reduced (from 12.1% to 4.5%). When a crosslinked coating is further applied onto the PAA coating, the surface composition is predominated by carbon, nitrogen and oxygen, which are the three atomic composition (excluding hydrogen because XPS does not count hydrogen in the surface composition). Such results indicate that the outmost layer of the SiHy contact lens with crosslinked coating is likely to be essentially consisting of the hydrophilic polymeric material which is the reaction product of poly(AAm-co-AA)(90/10) (60% C, 22% O and 18% N) and PAE.

The following commercial SiHy lenses which are vacuum-dried are also subjected to XPS analysis. The surface compositions of those commercial SiHy contact lenses are reported in Table 8.

TABLE 8

| | Surface Atomic composition (%) | | | | |
|---|---|---|---|---|---|
| | C | N | O | F* | Si |
| N&D ® Aqua ™ | 68.4 | 9.1 | 18.6 | 1.5 | 2.4 |
| Air Optix ® Aqua ™ | 67.7 | 9.9 | 18.2 | 1.9 | 2.4 |
| PureVision ® | 58.2 | 6.9 | 26.0 | 1.1 | 7.9 |
| Premio ™ | 61.1 | 6.9 | 23.6 | 1.8 | 6.6 |
| Acuvue ® Advance ® | 61.1 | 4.9 | 24.9 | 0.7 | 8.4 |
| Acuvue ® Oasys ® | 61.5 | 5.0 | 24.4 | 0.6 | 8.5 |
| TruEye ™ | 63.2 | 4.9 | 24.2 | 0.8 | 7.0 |
| Biofinity ® | 46.5 | 1.4 | 28.9 | 5.3 | 17.9 |
| Avaira ™ | 52.4 | 2.5 | 27.8 | 4.2 | 13.1 |

*Fluorine is detected aslo in Advance, Oasys and Trueye lenses, mostly likely from surface contamination during vacuum drying process XPS analysis It is found that a SiHy contact lens of the invention has a nominal silicone content, about 1.4%, in the surface layer, much lower than those of commercial SiHy lenses without plasma coatings (Acuvue® Advance®, Acuvue® Oasys®, TruEye™, Biofinity®, Avaira™) and PureVision® (with plasma oxidation) and Premio™ (with unknown plasma treatment), and even lower than the SiHy lenses with a plasma-deposited coating having a thickness of about 25 nm (N&D® Aqua™ and Air Optix® Aqua™). This very low value of Si % is comparable to the silicone atomic percentage of a control sample, polyethylene from Goodfellow (LDPE, d=0.015 mm; LS356526 SDS; ET31111512; 3004622910). Those results indicate that the very low value in the XPS analysis of vacuum dried SiHy contact lens of the invention may be due to contaminants introduced during preparation processess including vacuum drying process and XPS analysis, like the fluorine content in the lenses that do not contain fluorine. Silicone has been successfully shielded from exposure in the SiHy contact lenses of the invention.

XPS analysis of SiHy contact lenses of the invention (prepared according to the procedures described in Example 20), commercial SiHy contact lenses (CLARITI™ 1 Day, ACUVUE® TruEye™ (narafilcon A and narafilcon B)), polyethylene sheets from Goodfellow (LDPE, d=0.015 mm; LS356526 SDS; ET31111512; 3004622910), DAILIES® (polyvinylalcohol hydrogel lenses, i.e., non-silicone hydrogel lenses), ACUVUE® Moist (polyhydroxyethylmethacrylate hydrogel lenses, i.e., non-silicone hydrogel lenses) is also carried out. All lenses are vacuum-dried. Polyethylene sheets, DAILIES® and ACUVUE® Moist are used as control because they do not contain silicone. The silicone atomic compositions in the surface layers of the test samples are as following: 1.3±0.2 (polyethylene sheet); 1.7±0.9 (DAILIES®)); 2.8±0.9 (ACUVUE® Moist); 3.7±1.2 (three SiHy lenses prepared according to the procedures described in Example 20); 5.8±1.5 (CLARITI™ 1 Day); 7.8±0.1 (ACUVUE® TruEye™ (narafilcon A)); and 6.5±0.1 (ACUVUE® TruEye™ (narafilcon B)). The results for SiHy contact lens of the invention are closer to those of the traditional hydrogels then to the silicone hydrogels.

Example 23

Synthesis of UV-Absorbing Amphiphilic Branched Copolymer

A 1-L jacketed reactor is equipped with 500-mL addition funnel, overhead stirring, reflux condenser with nitrogen/vacuum inlet adapter, thermometer, and sampling adapter. 89.95 g of 80% partially ethylenically functionalized polysiloxane prepared in Example 17, A, is charged to the reactor and then degassed under vacuum less than 1 mbar at room temperature for about 30 minutes. The monomer solution prepared by mixing 1.03 g of HEMA, 50.73 g of DMA, 2.76 g of Norbloc methacrylate, 52.07 g of TRIS, and 526.05 g of ethyl acetate is charged to the 500-mL addition funnel followed with a degas under vacuum 100 mbar at room temperature for 10 minutes and then refilled with nitrogen gas. The monomer solution is degassed with same conditions for additional two cycles. The monomer solution is then charged to the reactor. The reaction mixture is heated to 67° C. with adequate stirring. While heating, a solution composed of 2.96 g of mercaptoethanol (chain transfer agent, CTA) and 0.72 g of dimethyl 2,2'-azobis(2-methylpropionate) (V-601-initiator) and 76.90 g of ethyl acetate is charged to the addition funnel followed by same degas process as the monomer solution. When the reactor temperature reaches 67° C., the initiator/CTA solution is also added to reactor. The reaction is performed at 67° C. for 8 hours. After the copolymerization is completed, reactor temperature is cooled to room temperature.

Synthesis of UV-Absorbing Amphiphilic Branched Prepolymer

The copolymer solution prepared above is ethylenically functionalized to form an amphiphilic branched prepolymer by adding 8.44 g of IEM (or 2-isocyanatoethyl methacrylate in a desired molar equivalent amount) in the presence of 0.50 g of DBTDL. The mixture is stirred at room temperature under a sealed condition for 24 hours. The prepared prepolymer is then stabilized with 100 ppm of hydroxytetramethylene piperonyloxy before the solution is concentrated to 200 g (~50%) and filtered through 1 um pore size filter paper. After the reaction solvent is exchanged to 1-propanol through repeated cycles of evaporation and dilution, the solution is ready to be used for formulation. The solid content is measured via removing the solvent at vacuum oven at 80° C.

Preparation of Lens Formulation

A lens formulation is prepared to have the following composition: 71% by weight of prepolymer prepared above; 4% by weight of DMA; 1% by weight of TPO; 1% by weight of DMPC; 1% by weight of Brij 52 (from), and 22% by weight of 1-PrOH.

Lens Preparation

Lenses are fabricated by cast-molding of the lens formulation prepared above using reusable mold, similar to the mold shown in FIGS. 1-6 in U.S. Pat. Nos. 7,384,590 and 7,387,759 (FIGS. 1-6) under spatial limitation of UV irradiation. The mold comprises a female mold half made of glass and a male mold half made of quartz. The UV irradiation source is a Hamamatsu lamp with a 380 nm-cut-off filter at an intensity of about 4.6 mW/cm². The lens formulation in the mold is irradiated with UV irradiation for about 30 seconds.

Cast-molded lenses are extracted with methyl ethyl ketone (MEK), rinsed in water, coated with polyacrylic acid (PAA) by dipping lenses in a propanol solution of PAA (0.004% by weight, acidified with formic acid to about pH 2.0), and hydrated in water.

IPC Saline is prepared from a composition containing about 0.07% PAAm-PAA and sufficient PAE to provide an initial azetidinium content of approximately 8.8 millimole equivalents/Liter (~0.15% PAE) under pre-reaction conditions of 6 hrs at approximately 60° C. 5 ppm hydrogen peroxide is then added to the IPC salines to prevent bioburden growth and the IPC salines are filtered using a 0.22 micron polyether sulphone [PES] membrane filter Lenses are placed in a polypropylene lens packaging shell with 0.6 mL of the IPC saline (half of the saline is added prior to inserting the lens). The blister is then sealed with foil and autoclaved for 30 min at 121° C.

Lens Characterization

The obtained lenses have the following properties: E'~0.82 MPa; $DK_c$~159.4 (using Iotrafilcon B as reference lenses, an average center thickness of 80 μm and an intrinsic Dk 110); IP~2.3; water %~26.9; and UVA/UVB % T~4.6/0.1. When observed under dark field microscope, no cracking lines are visible after rubbing the test lens. The lenses are very lubricious in a finger rubbing test and equivalent to the control lenses.

Example 24

Preparation of Lens Formulations

Formulation I is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Formulation II is prepared by dissolving components in 1-propanol to have the following composition: about 32% by weight of CE-PDMS macromer prepared in Example 2, about 21% by weight of TRIS-Am, about 23% by weight of DMA, about 0.6% by weight of L-PEG, about 1% by weight of DC1173, about 0.1% by weight of visitint (5% copper phthalocyanine blue pigment dispersion in TRIS), about 0.8% by weight of DMPC, about 200 ppm H-tempo, and about 22% by weight of 1-propanol.

Preparation of Lenses

Lenses are prepared by cast-molding from a lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The UV irradiation source is a Hamamatsu lamp with the WG335+TM297 cut off filter at an intensity of about 4 mW/cm². The lens formulation in the mold is irradiated with UV irradition for about 25 seconds. Cast-molded lenses are extracted with methyl ethyl ketone (MEK) (or propanol or isopropanol).

Application of PAA Prime Coating onto SiHy Contact Lenses

A polyacrylic acid coating solution (PAA-1) is prepared by dissolving an amount of PAA (M.W.: 450 kDa, from Lubrizol) in a given volume of 1-propanol to have a concentration of about 0.39% by weight and the pH is adjusted with formic acid to about 2.0.

Another PAA coating solution (PAA-2) is prepared by dissolving an amount of PAA (M.W.: 450 kDa, from Lubrizol) in a given volume of an organic-based solvent (50/50 1-propanol/H₂O) to have a concentration of about 0.39% by weight and the pH is adjusted with formic acid to about 2.0.

Above-obtained SiHy contact lenses are subjected to one of dipping processes shown in Tables 9 and 10.

TABLE 9

| | | Dipping Process | | | | | |
|---|---|---|---|---|---|---|---|
| Baths | Time | 20-0 | 20-1 | 20-2 | 20-3 | 20-4 | 20-5 |
| 1 | 56 s | H2O | H2O | H2O | H2O | H2O | H2O |
| 2 | 44 s | MEK | MEK | MEK | MEK | MEK | MEK |
| 3 | 56 s | MEK | MEK | MEK | MEK | MEK | MEK |

TABLE 9-continued

Dipping Process

| Baths | Time | 20-0 | 20-1 | 20-2 | 20-3 | 20-4 | 20-5 |
|---|---|---|---|---|---|---|---|
| 4 | 56 s | MEK | MEK | MEK | MEK | MEK | MEK |
| 5 | 56 s | MEK | MEK | MEK | MEK | MEK | MEK |
| 6 | 56 s | MEK | MEK | MEK | MEK | MEK | MEK |
| 7 | 56 s | MEK | MEK | MEK | MEK | MEK | MEK |
| 8 | 56 s | H2O | H2O | H2O | H2O | H2O | H2O |
| 9 | 44 s | PAA-1 | PAA-1 | PAA-1 | PAA-2 | PAA-2 | PAA-1 |
| 10 | 56 s | PAA-1 | PAA-1 | PAA-1 | PAA-2 | PAA-2 | PAA-1 |
| 11 | 56 s | H2O | PrOH | H2O | H2O | H2O | H2O |
| 12 | 44 s | H2O | PrOH | PrOH | PrOH | 50/50 | 50/50 |
| 13 | 56 s | H2O | H2O | H2O | H2O | H2O | H2O |
| 14 | 56 s | H2O | H2O | H2O | H2O | H2O | H2O |
| 15 | 56 s | PBS | PBS | PBS | PBS | PBS | PBS |
| 16 | 56 s | H2O | H2O | H2O | H2O | H2O | H2O |

PrOH represents 100% 1-propanol;
PBS stands for phosphate-buffered saline;
MEK stands for methyl ethyl keton;
50/50 stands a solvent mixture of 50/50 1-PrOH/H$_2$O.

TABLE 10

Dipping Process

| Baths | Time | 80-0 | 80-1 | 80-2 | 80-3 | 80-4 | 80-5 | 80-6 |
|---|---|---|---|---|---|---|---|---|
| 1 | 56 s | H2O | H2O | H2O | H2O | H2O | H2O | H2O |
| 2 | 44 s | MEK | MEK | MEK | MEK | MEK | MEK | MEK |
| 3 | 56 s | MEK | MEK | MEK | MEK | MEK | MEK | MEK |
| 4 | 56 s | MEK | MEK | MEK | MEK | MEK | MEK | MEK |
| 5 | 56 s | MEK | MEK | MEK | MEK | MEK | MEK | MEK |
| 6 | 56 s | MEK | MEK | MEK | MEK | MEK | MEK | MEK |
| 7 | 56 s | MEK | MEK | MEK | MEK | MEK | MEK | MEK |
| 8 | 56 s | H2O | H2O | H2O | H2O | H2O | H2O | H2O |
| 9 | 44 s | PAA-1 | PAA-1 | PAA-1 | PAA-1 | PAA-1 | PAA-1 | PAA-1 |
| 10 | 56 s | PAA-1 | 50/50 | PrOH | 50/50 | PrOH | PrOH | H2O |
| 11 | 56 s | H2O | H2O | H2O | 50/50 | PrOH | 50/50 | 50/50 |
| 12 | 44 s | H2O | H2O | H2O | H2O | H2O | H2O | H2O |
| 13 | 56 s | H2O | H2O | H2O | H2O | H2O | H2O | H2O |
| 14 | 56 s | H2O | H2O | H2O | H2O | H2O | H2O | H2O |
| 15 | 56 s | PBS | PBS | PBS | PBS | PBS | PBS | PBS |
| 16 | 56 s | H2O | H2O | H2O | H2O | H2O | H2O | H2O |

PrOH represents 100% 1-propanol;
PBS stands for phosphate-buffered saline;
MEK stands for methyl ethyl keton;
50/50 stands a solvent mixture of 50/50 1-PrOH/H$_2$O.

Application of Crosslinked Hydrophilic Coating

Poly(acrylamide-co-acrylic acid) partial sodium salt, Poly(AAm-co-AA)(90/10) (~90% solid content, poly(AAm-co-AA) 90/10, Mw 200,000) is purchased from Polysciences, Inc. and used as received. PAE (Kymene, an azetidinium content of 0.46 assayed with NMR) is purchased from from Ashland as an aqueous solution and used as received. An in-package-crosslinking (IPC) saline is prepared by dissolving about 0.07% w/w of poly(AAm-co-AA)(90/10) and about 0.15% of PAE (an initial azetidinium millimolar equivalents of about 8.8 millimole) in phosphate buffered saline (PBS) (about 0.044 w/w % NaH$_2$PO$_4$.H$_2$O, about 0.388 w/w/ % Na$_2$HPO$_4$.2H$_2$O, about 0.79 w/w % NaCl) and adjusting the pH to 7.2~7.4. Then the IPC saline is heat pre-treated for about 4 hours at about 70° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. 10 ppm hydrogen peroxide is then added to the final IPC saline to prevent bioburden growth and the IPC saline is filtered using a 0.22 micron polyether sulphone [PES] membrane filter.

Lenses having a PAA prime coating thereon prepared above are placed in polypropylene lens packaging shells (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked hydrophilic coatings thereon.

Characterization of SiHy Lenses.

The resultant SiHy contact lenses with crosslinked hydrophilic coatings thereon and a center thickness of about 0.95 microns have an oxygen permeability (Dk$_c$ or estimated intrinsic Dk) of about 142 to about 150 barrers, a bulk elastic modulus of about 0.72 to about 0.79 MPa, a water content of about 30% to about 33% by weight, a relative ion permeability of about 6 (relative to Alsacon lens), and a contact angle of from about 34 to about 47 degrees.

Characterization of the Nano-Textured Surfaces of Contact Lens

Transmission-Differential-Interference-Contrast (TDIC) Method.

Contact lenses are placed on a glass slide and flattened by compressing the lens between the slide and a glass cover slip. Contact lens surfaces are located and examined by focusing through the lens using a Nikon ME600 microscope with transmission differential interference contrast optics using a 40× objective lens. The obtained TDIC images are then evaluated to determine the presence of winkled surface patterns (e.g., random and/or ordered worm-like patterns, or the likes).

Reflection-Differential-Interference-Contrast (RDIC) Method.

Lenses are placed on a glass slide and flattened by making 4 radial cuts every ~90 degrees. Excess saline is blown off the surface using compressed air. Lens surface is then examined using Nikon Optiphot-2 with reflection differential interference contrast optics for the presence of winkled surface patterns on the surfaces of a contact lens using 10×, 20× and 50× objective lenses. A representative image of each side is acquired using 50× objective lens. The contact lens is then flipped over, excess saline removed and the other side of the contact lens and is inspected in the same way. The obtained RDIC images are then evaluated to determine the presence of winkled surface patterns (e.g., random and/or ordered worm-like patterns, or the likes).

Dark Field Light Microscopy (DFLM).

DFLM is generally based on dark field illumination which is a method of enhancing contrast in observed samples. This technique consists of a light source outside or blocked from the observer's field of view in order to illuminate a sample at an angle relative to normal transmitted light. Since the un-scattered light from the source is not gathered by the objective lens, it is not part of the image and the background of the image appears dark. Since the light source is illuminating the sample at an angle, the light observed in the sample image is that which is scatted by the sample toward the observer, contrast is then created between this scattered light from the sample and the dark background of the image. This contrast mechanism makes dark illumination especially useful for the observation of scattered phenomena such as haze.

DFLM is used to evaluate the haziness of contact lenses as follows. It is believed that since the dark-field setup involves scattered light, dark-field data could provide the worst-case estimate of haziness. In 8-bit grey scale digital images each image pixel is assigned a grey scale intensity (GSI) value in the range from 0-255. Zero represents a pixel that is perfectly black and 255 represents a pixel that is perfectly white. An increase in the scattered light captured in the image will produce pixels with higher GSI values. This GSI value can then be used as a mechanism to quantify the amount of scattered light observed in a dark field image. The haziness is expressed by averaging the GSI values of all pixels in an area of interest (AOI) (e.g., a whole lens or the lenticular zone or optical zone of a lens). The experimental set-up consists of a microscope or equivalent optics, an attached digital camera and a dark field stand with ring light and variable intensity light source. Optics is designed/ arranged so that the entirety of the contact lens to be observed fills the field of view (typically ~15 mm×20 mm field of view). Illumination is set to a level appropriate to observe the desired changes in the relevant samples. Light intensity is adjusted/calibrated to the same level for each set of samples using a density/light scattering standard as known to a person skilled in the art. For example, a standard is composed of two overlapping plastic cover slips (identical and slight or moderately frosted). Such standard consists of areas with three different averaged GSI that include two areas with intermediate grey scale levels and saturated white (edges). The black areas represent the empty dark field. The black and saturated white areas can be used to verify gain and offset (contrast and brightness) settings of camera. The intermediate grey levels can provide three points to verify the linear response of the camera. Light intensity is adjusted so that the average GSI of the empty dark field approaches 0 and that of a defined AOI in a digital image of the standard is the same each time within ±5 GSI units. After light intensity calibration, a contact lens is immersed in 0.2 μm-filtered phosphate buffer saline in a quartz Petri dish or a dish or similar clarity which is placed on the DFLM stand. An 8-bit grey scale digital image of the lens is then acquired as viewed using the calibrated illumination and the average GSI of a defined AOI within the portion of the image containing the lens is determined. This is repeated for a sample set of contact lenses. Light intensity calibration is re-evaluated periodically over the course of a test to ensure consistency. The level of haziness under DFLM examination refers to a DFLM haziness GSI/255×100%.

SiHy contact lenses, the PAA prime coating of which is obtained according to either of the dipping processes 20-0 and 80-0, are determined to have an averaged DFLM haziness of about 73% and show wrinkle surface patterns (random worm-like patterns) that can be visually observed by examining the contact lens in hydrated state, according to the method of either RDIC or TDIC as described above. But, the winkled surface patterns have practically no adverse effects upon the light transmissibility of the contact lenses.

SiHy contact lenses, the PAA prime coating of which is obtained according to either of the dipping processes 20-1 to 20-4, are determined to have a low averaged DFLM haziness of about 26% (probably due to the presence of visitint pigment particles) and show no noticeable wrinkle surface patterns (random worm-like patterns) when examined under either RDIC or TDIC as described above.

A high percentage of SiHy contact lenses, the PAA prime coating of which is obtained according to either of the dipping process 20-5, are determined to have a moderate averaged DFLM haziness of about 45% and show slightly noticeable wrinkle surface patterns when examined under either RDIC or TDIC as described above. But, the winkled surface patterns have practically no adverse effects upon the light transmissibility of the contact lenses.

SiHy contact lenses, the PAA prime coating of which is obtained according to either of the dipping processes 80-1, 80-2, 80-3, 80-5 and 80-6, do not show noticeable wrinkle surface patterns when examined under either RDIC or TDIC as described above. But, SiHy contact lenses, the PAA prime coating of which is obtained according to either of the dipping processes 80-0 and 80-4, show noticeable wrinkle surface patterns when examined under either RDIC or TDIC as described above. But, the winkled surface patterns have practically no adverse effects upon the light transmissibility of the contact lenses.

What is claimed is:

1. A readily-usable silicone hydrogel contact lens, comprising:
    a preformed silicone hydrogel contact lens;
    a reactive base coating on the preformed silicone hydrogel contact lens, wherein the reactive base coating comprises at least one layer of a reactive polymer having pendant carboxyl groups; and
    a crosslinked hydrophilic coating which is covalently attached onto the reactive base coating through neutral, hydroxyl-containing covalent linkages each of which is obtained by reacting, in a crosslinking reaction at a temperature from about 40° C. to about 140° C., between one positively-charged azetidinium group and one amino or carboxyl group,
    wherein the reactive polymer is polyacrylic acid, polymethacrylic acid, poly($C_2$-$C_{12}$ alkylacrylic acid), poly[acrylic acid-co-methacrylic acid], poly[$C_2$-$C_{12}$ alkylacrylic acid-co-(meth)acrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], or combinations thereof,
    wherein the crosslinked hydrophilic coating is obtained from a water-soluble and thermally-crosslinkable hydrophilic polymeric material which comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, and (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent,
    wherein the readily-usable silicone hydrogel contact lens has (1) an averaged water contact angle of about 80 degrees or less, (2) an oxygen permeability of at least about 40 barrers, (3) an elastic modulus of about 1.5 MPa or less, and (4) a water content of from about 18% to about 70% by weight when fully hydrated.

2. The readily-usable silicone hydrogel contact lens of claim 1, wherein the readily-usable silicone hydrogel contact lens has an averaged water contact angle of about 70 degrees or less.

3. The readily-usable silicone hydrogel contact lens of claim 1, wherein the readily-usable silicone hydrogel contact lens has an averaged water contact angle of about 60 degrees or less.

4. The readily-usable silicone hydrogel contact lens of claim 1, wherein the readily-usable silicone hydrogel contact lens has an averaged water contact angle of about 50 degrees or less.

5. The readily-usable silicone hydrogel contact lens of claim 1, wherein the reactive polymer is polyacrylic acid, polymethacrylic acid, poly($C_2$-$C_{12}$ alkylacrylic acid), or combinations thereof.

6. The readily-usable silicone hydrogel contact lens of claim 1, wherein the hydrophilicity-enhancing agent is a hydrophilic polymers having one or more amino, carboxyl and/or thiol groups, wherein the content of monomeric units having an amino, carboxyl or thiol group in the hydrophilic polymer as the hydrophilicity-enhancing agent is less than about 40% by weight based on the total weight of the hydrophilic polymer.

7. The readily-usable silicone hydrogel contact lens of claim 6, wherein the hydrophilic polymer as the hydrophilicity-enhancing agent is: a polyethylene glycol having one sole amino, carboxyl or thiol group; a polyethylene glycol with two terminal amino, carboxyl and/or thiol groups; multi-arm polyethylene glycol with one or more amino, carboxyl and/or thiol groups; polyethylene glycol dendrimers with one or more amino, carboxyl and/or thiol groups.

8. The readily-usable silicone hydrogel contact lens of claim 6, wherein the hydrophilic polymer as the hydrophilicity-enhancing agent is a copolymer which is a polymerization product of a composition comprising (1) about 60% by weight or less by weight of at least one reactive vinylic monomer and (2) at least one non-reactive hydrophilic vinylic monomer and/or at least one phosphorylcholine-containing vinylic monomer; or combinations thereof;

wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_{12}$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof;

wherein the non-reactive hydrophilic vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-methyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

9. The readily-usable silicone hydrogel contact lens of claim 6, wherein the hydrophilic polymer as the hydrophilicity-enhancing agent is a monoamino-, monocarboxyl-, diamino- or dicarboxyl-terminated homo- or copolymer of a non-reactive hydrophilic vinylic monomer selected from the group consisting of acryamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, (meth)acryloyloxyethyl phosphorylcholine, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, and combination thereof.

10. The readily-usable silicone hydrogel contact lens of claim 6, wherein the hydrophilic polymer as the hydrophilicity-enhancing agent is an amino- or carboxyl-containing polysaccharide, hyaluronic acid, chondroitin sulfate, and combinations thereof.

11. The readily-usable silicone hydrogel contact lens of claim 6, wherein the weight average molecular weight $M_w$ of the hydrophilic polymer as the hydrophilicity-enhancing agent is from about 500 to about 1,000,000.

12. The readily-usable silicone hydrogel contact lens of claim 6, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

13. The readily-usable silicone hydrogel contact lens of claim 5, wherein the hydrophilicity-enhancing agent is a hydrophilic polymers having one or more amino, carboxyl and/or thiol groups, wherein the content of monomeric units having an amino, carboxyl or thiol group in the hydrophilic polymer as the hydrophilicity-enhancing agent is less than about 40% by weight based on the total weight of the hydrophilic polymer.

14. The readily-usable silicone hydrogel contact lens of claim 13, wherein the hydrophilic polymer as the hydrophilicity-enhancing agent is: a polyethylene glycol having one sole amino, carboxyl or thiol group; a polyethylene glycol with two terminal amino, carboxyl and/or thiol groups; multi-arm polyethylene glycol with one or more amino, carboxyl and/or thiol groups; polyethylene glycol dendrimers with one or more amino, carboxyl and/or thiol groups.

15. The readily-usable silicone hydrogel contact lens of claim 13, wherein the hydrophilic polymer as the hydrophilicity-enhancing agent is a copolymer which is a polymerization product of a composition comprising (1) about 60% by weight or less by weight of at least one reactive vinylic monomer and (2) at least one non-reactive hydrophilic vinylic monomer and/or at least one phosphorylcholine-containing vinylic monomer; or combinations thereof;

wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_{12}$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof;

wherein the non-reactive hydrophilic vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

16. The readily-usable silicone hydrogel contact lens of claim 13, wherein the hydrophilic polymer as the hydrophilicity-enhancing agent is a monoamino-, monocarboxyl-, diamino- or dicarboxyl-terminated homo- or copolymer of a non-reactive hydrophilic vinylic monomer selected from the group consisting of acryamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, (meth)acryloyloxyethyl phosphorylcholine, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N, N-dimethylaminoethyl (meth)acrylate, N,N-dimethylaminopropyl (metha)crylamide, and combination thereof.

17. The readily-usable silicone hydrogel contact lens of claim 13, wherein the hydrophilic polymer as the hydrophilicity-enhancing agent is an amino- or carboxyl-containing polysaccharide, hyaluronic acid, chondroitin sulfate, and combinations thereof.

18. The readily-usable silicone hydrogel contact lens of claim 13, wherein the weight average molecular weight $M_w$ of the hydrophilic polymer as the hydrophilicity-enhancing agent is from about 500 to about 1,000,000.

19. The readily-usable silicone hydrogel contact lens of claim 13, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

20. The readily-usable silicone hydrogel contact lens of claim 8, wherein the hydrophilic polymer as the hydrophilicity-enhancing agent is a copolymer which is a polymerization product of a composition comprising (1) about 60% by weight or less by weight of at least one reactive vinylic monomer and (2) at least one phosphorylcholine-containing vinylic monomer; or combinations thereof.

* * * * *